US011800200B2

United States Patent
Lohmar et al.

(10) Patent No.: US 11,800,200 B2
(45) Date of Patent: Oct. 24, 2023

(54) LOW LATENCY MEDIA INGESTION SYSTEM, DEVICES AND METHODS

(71) Applicant: Telefonaktiebolaget LM Ericsson (publ), Stockholm (SE)

(72) Inventors: Thorsten Lohmar, Aachen (DE); Michael John Slssingar, Waterlooville (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 231 days.

(21) Appl. No.: 17/321,113

(22) Filed: May 14, 2021

(65) Prior Publication Data

US 2021/0274266 A1  Sep. 2, 2021

Related U.S. Application Data

(63) Continuation of application No. 16/613,716, filed as application No. PCT/EP2017/061755 on May 16, 2017, now Pat. No. 11,019,409.

(51) Int. Cl.
*H04N 21/845* (2011.01)
*H04L 65/80* (2022.01)
(Continued)

(52) U.S. Cl.
CPC ....... *H04N 21/8456* (2013.01); *H04L 65/611* (2022.05); *H04L 65/612* (2022.05);
(Continued)

(58) Field of Classification Search
CPC . H04N 21/8456; H04L 65/612; H04L 65/611; H04L 65/65; H04L 65/80; H04L 67/02
See application file for complete search history.

(56) References Cited

U.S. PATENT DOCUMENTS 7,221,684 B1 * 5/2007 Smith .................... H04L 69/04
370/477
10,237,195 B1 * 3/2019 Karach ................. H04L 65/612
(Continued)

FOREIGN PATENT DOCUMENTS

CN     104067643 A    9/2014
CN     104509064 A    4/2015
(Continued)

OTHER PUBLICATIONS

International Search Report and Written Opinion dated Jan. 23, 2018, issued in PCT Application No. PCT/EP2017/061755, consisting of 12 pages.
(Continued)

*Primary Examiner* — Jonathan A Bui
(74) *Attorney, Agent, or Firm* — Christopher & Weisberg, P.A.

(57) ABSTRACT

A media distribution system and method wherein a media streaming network includes a media ingest network portion configured to provide low latency uploading of media fragments of a segmented live media stream using HTTP chunked transfer encoding (CTE). In one embodiment, one or more fragments of a segment are uploaded or otherwise ingested on a chunk-by-chunk basis before entire media data of the segment becomes available. An IP multicast distribution network portion coupled to the media ingest network portion is operative for distributing chunked media data to one or more IP multicast recipients using an IP multicast
(Continued)

protocol. A client application is operative to download the media data in an HTTP CTE delivery session with a serving IP multicast recipient.

14 Claims, 20 Drawing Sheets

(51) Int. Cl.
    *H04L 67/02* (2022.01)
    *H04L 65/65* (2022.01)
    *H04L 65/611* (2022.01)
    *H04L 65/612* (2022.01)

(52) U.S. Cl.
    CPC ............ *H04L 65/65* (2022.05); *H04L 65/80* (2013.01); *H04L 67/02* (2013.01)

(56) References Cited

U.S. PATENT DOCUMENTS

| | | | |
|---|---|---|---|
| 11,191,049 B1* | 11/2021 | Chandrasekher | H04W 56/001 |
| 2002/0196784 A1* | 12/2002 | Masuda | H04J 3/14 370/245 |
| 2008/0244120 A1* | 10/2008 | Park | G06F 13/385 710/65 |
| 2009/0147704 A1 | 6/2009 | Moore | |
| 2013/0304916 A1* | 11/2013 | Hodapp | H04L 67/02 709/224 |
| 2013/0322628 A1 | 12/2013 | Rhyu et al. | |
| 2014/0032987 A1 | 1/2014 | Nagaraj et al. | |
| 2014/0126357 A1 | 5/2014 | Kulkarni et al. | |
| 2015/0237091 A1 | 8/2015 | Liang et al. | |
| 2016/0182598 A1* | 6/2016 | Cossa | H04L 65/611 370/252 |
| 2016/0191672 A1* | 6/2016 | Perlman | H04L 12/4633 370/474 |
| 2016/0212496 A1 | 7/2016 | Lau et al. | |
| 2016/0323348 A1 | 11/2016 | Bradbury et al. | |
| 2017/0055046 A1 | 2/2017 | Lee et al. | |
| 2017/0070551 A1 | 3/2017 | Phillips et al. | |
| 2018/0131742 A1* | 5/2018 | DiMattia | H04L 67/02 |
| 2018/0310075 A1* | 10/2018 | Casal Martin | H04L 65/80 |

FOREIGN PATENT DOCUMENTS

| | | |
|---|---|---|
| CN | 105122767 A | 12/2015 |
| GB | 2521845 A | 7/2015 |
| WO | 2016064728 A1 | 4/2016 |

OTHER PUBLICATIONS

Low latency live video streaming using HTTP chunked encoding; Viswanathan Swaminathan et al: Multimedia Signal Processing (MMSP), 2011 IEEE 13th International Workshop on, IEEE, Oct. 17, 2011 (Oct. 17, 2011), pp. 1-6, XP032027565, DOI: Consisting of 6 pages.

Overhead and performance of low latency live streaming using MPEG-DASH, Bouzakaria Nassima et al: IISA 2014, The 5th International Conference on Information, Intelligence, Systems and Applications, IEEE, Jul. 7, 2014 (Jul. 7, 2014); Consisting of 6 pages.

Fielding UC Irvine J. Gettys Compaq/W3C; J. Mogul Compaq; H. Frystyk W3C/MIT, L. Masinter Xerox, P. Leach Microsoft T. Berners-Lee W3C/MIT R: "Hypertext Transfer Protocol—HTTP/1.1; rfc2616.txt", Internet Engineering Task Force, IETF; Standard, Internet Society (ISOC) 4, Rue Des Falaises CH-1205 Geneva, Switzerland, Jun. 1, 1999 (Jun. 1, 1999), XP015008399; Consisting of 177 pages.

Dinkar Bhat et al.; An Architectural Approach Towards Achieving Bandwidth-Efficient Content Delivery; Arris; Copyright 2016; Consisting of 13 Pages.

Thorsten Lohmar et al.; Dynamic Adaptive HTTP Streaming of Live Content; 2011 IEEE International Symposium on a World of Wireless, Mobile and Multimedia Networks; Jun. 20-24, 2011, consisting of 8-pages.

Indian Examination Report dated Mar. 9, 2021 for Application No. 201917046410, consisting of 8 pages.

Chinese Notice of Allowance and English Translation dated May 5, 2022 for Application No. 201780093259.7, consisting of 6 pages.

Chinese Office Action with English Summary Translation dated Sep. 2, 2021 for Patent Application No. 201780093259.7, consisting of 24-pages.

* cited by examiner

LOW LATENCY MEDIA INGESTION SYSTEM, DEVICES AND METHODS

CROSS-REFERENCE TO RELATED APPLICATIONS

This application is a Continuation of U.S. Ser. No. 16/613,716 filed Nov. 14, 2019, entitled "LOW LATENCY MEDIA INGESTION SYSTEM, DEVICES AND METHODS", which is a National Stage application of International Application No. PCT/EP2017/061755, filed May 16, 2017, entitled "LOW LATENCY MEDIA INGESTION SYSTEM, DEVICES AND METHODS", the entireties of both of which of which are incorporated herein by reference.

FIELD OF THE DISCLOSURE

The present disclosure generally relates to communication networks. More particularly, and not by way of any limitation, the present disclosure is directed to a network architecture, system, devices and methods for facilitating low latency media ingestion and distribution using reliable multicast over one or more fixed networks, wireless networks, and/or any combination thereof.

BACKGROUND

With the increasing data rates offered by fixed and mobile networks, multimedia streaming services are getting wider distribution. The mobile video consumption is also exploding, given the ever-increasing number of smartphones in the market. In order to realize video streaming, Real-Time Streaming Protocol (RTSP) and Session Description Protocol (SDP) for session setup and control and Real-Time Transport Protocol (RTP) for the transport of real-time speech, audio and video are widely used. To cope with fluctuating bitrates on the transmission path, adaptive RTP streaming techniques are used as well. However, it is well known that RTSP/RTP streaming has several deficiencies in network environments that include firewalls and network address translation (NAT) traversals.

Adaptive streaming technology based on Hypertext Transfer Protocol (HTTP) is being implemented to handle increasing consumer demands for streaming content (e.g., broadcast and on-demand movies/TV, etc.) across a variety of network infrastructures to subscriber stations having widely differing performance and protocols, both in managed and unmanaged network environments. IP (Internet Protocol) multicast is being pursued in both fixed and mobile network architectures to leverage economies of scale as well as to address issues such as bandwidth, content protection, scalability and reachability, in addition to achieving key performance indicators (KPI), among others. Whereas advances in the media delivery technology continue apace, several issues remain challenging, especially with respect to live media delivery.

SUMMARY

For adaptive live media streams, it is desirable to reduce the overall end-to-end delay so that the media as viewed by the end consumer is as close as possible in time to reality. Delays may be caused by several factors, all of which can contribute to the overall end-to-end delay in a media streaming network. For example, with respect to a live event, there is a delay component relative to media capture, encoding, and processing. Where media segmentation is implemented in an adaptive bitrate (ABR) streaming architecture, there can be a loading delay when segments cannot be made available to server nodes until the segments are completely processed.

The present patent disclosure is broadly directed to systems, methods, apparatuses, as well as network nodes and associated non-transitory computer-readable media for facilitating media distribution in a media streaming network that includes a media ingest network portion configured to provide low latency uploading of media fragments of a segmented live media stream using HTTP chunked transfer encoding (CTE). In an example embodiment, one or more fragments of a segment are uploaded or otherwise provided, e.g., including but not limited to triggered push, pull and/or hybrid data transfer mechanisms, on a chunk-by-chunk basis before entire media data of the segment becomes available. An IP multicast distribution network portion coupled to the media ingest network portion is operative for distributing chunked media data to one or more IP multicast recipients using an IP multicast protocol. In one embodiment, a client application is operative to download the media data in an HTTP CTE delivery session with a serving IP multicast recipient. In another embodiment, a client application may be integrated with the IP multicast receiver functionality, wherein suitable API calls may be used instead of HTTP CTE for fetching the media data.

In one aspect, a low latency media ingestion method, e.g., including pull, push, etc., is disclosed. The method comprises, inter alia, generating, by a media packager node, a segmented media stream from an incoming media stream, wherein each segment comprises a plurality of fragments, each fragment comprising one or more frames of media data, e.g., audio frames, video frames, or a combination thereof. The segmented stream is identified to be for distribution using IP multicast, and is associated with a particular IP multicast group. Optionally, a particular IP multicast protocol (e.g., NORM, FLUTE, FCAST, etc.) may be identified. An HTTP CTE session is initiated between the media packager node and an origin server node. This may be done by the media packager node, e.g. in a push scenario, by the origin server, e.g. in a pull scenario, or by a further control node. The origin server may e.g. be associated with a content distribution network (CDN), or may be a broadcast-multicast service center, BMSC, node of a mobile telecommunications network. For each segment N of the segmented stream, the following acts are performed: commencing ingesting fragments of the segment N to the origin server node before entire media data for the segment N is available, on a chunk-by-chunk basis via the HTTP CTE session, wherein one or more chunks are provided for transmitting each fragment; and sending a last chunk signal to the origin server node after all fragments of the segment N have been transmitted. In some embodiments, the segmenter may be configured to upload fragments only after receiving an HTTP GET request. In other embodiments, the segmenter may upload fragments according to the segment availability time. In still another variation, the media ingestion method may include sending an indication to the origin server node, before commencing uploading of the fragments, to indicate the number of chunks provided for packing and transmitting each fragment.

In another aspect, a media packager apparatus is disclosed, the apparatus comprising at least one network interface configured to receive live media streams from one or more content sources. The media packager apparatus is configured to segment a received live media stream into a plurality of segments, wherein each segment comprises a plurality of fragments, each fragment comprising one or more frames of media data, to identify that the segmented stream is to be distributed using IP multicast and associate the segmented stream with a particular IP multicast group and to initiate an HTTP chunked transfer encoding, CTE, session with an origin server node. It is further configured to commence ingesting fragments of a segment N to the origin server node via the CTE session before entire media data for the segment N is available, wherein one or more chunks are provided for transmitting each fragment and send a last chunk signal to the origin server node after all fragments of the segment N have been transmitted. The media packager apparatus may comprise an encoder for generating a plurality of bitrate representations for each live media stream, and/or a segmenter configured to segment each bitrate representation of a particular live media stream into a plurality of segments. It may further comprise one or more processors and one or more persistent memory modules having program instructions stored thereon which, when executed by the one or more processors, perform the above steps.

In another aspect, a media distribution method that is adapted for transmission of low latency fragments is disclosed. The method comprises, inter alia, receiving at an origin server node a message from a media packager node for commencing an HTTP CTE session with the media packager node, wherein the message includes an indication that media data of a live media stream will be ingested to the origin server node. For each segment N of the media stream, one or more HTTP headers are received from the media packager node. Thereafter, one or more fragments of the segment are received, on a chunk-by-chunk basis via the HTTP CTE session, each chunk having a chunk boundary mark, wherein each fragment contains one or more frames of media data and is received before entire media data for the segment is available at the media packager node. The chunk boundary mark may for example be realized through the chunk-size indication, which is provided at the beginning of an HTTP chunk. Transport objects, particularly IP multicast transport objects, are generated for each chunk, which may be dependent on the (IP multicast) protocol used. The transport objects, which may contain full fragments or partial fragments, are transported to a plurality of receivers, e.g. CDN edge nodes, particularly home gateways, and/or user terminals. Depending on implementation, explicit or inherent signaling may be provided to indicate transmission/reception of a last chunk from the media packager node, e.g., after all fragments of the segment have been uploaded. In a further variation, responsive to a last chunk signal, sizes of all chunks may be summed up to generate an object size indication associated with the segment and signaled to the plurality of edge multicast receivers.

In another aspect, an origin server is disclosed, comprising an HTTP chunked transfer encoding, CTE, server and/or client and an IP multicast sender. The origin server is configured to receive a message from a media packager node for commencing an HTTP CTE session with the media packager node, the message including an indication that media data of a segmented live media stream is provided in a chunked delivery, and to receive, for each segment N of the live media stream, one or more HTTP headers from the media packager node and one or more fragments of the segment, on a chunk-by-chunk basis via the HTTP CTE session, each chunk having a chunk boundary mark, wherein each fragment contains one or more frames of media data and is received before entire media data for the segment is available at the media packager node. It is further configured to generate transport objects, particularly IP multicast transport objects, for the received chunks and transmit the transport objects to a plurality of receivers, and to receive a last chunk signal from the media packager node after all fragments of the segment have been ingested.

In the above aspects, the origin server may e.g. be associated with a content distribution network (CDN), or may be a broadcast-multicast service center, BMSC, node of a mobile telecommunications network. Further, ingesting may in this context mean uploading, e.g. by the media packager node to the origin server node, downloading, e.g. by the origin server node from the media packager node, or otherwise transferring from the media packager node to the origin server node. In an exemplary embodiment, the last chunk signal may be realized by sending an HTTP Chunk of size zero bytes. This indicates that the transmission of the HTTP body part is completed.

In a further aspect, a media delivery method based on reception of low latency fragments is disclosed. The method comprises, inter alia, receiving, at an IP multicast receiver, an IP multicast information message relative to distribution of media data of a live media stream from an IP multicast sender. In one arrangement, the IP multicast information message may include HTTP headers containing location information, MIME type, and other metadata. Protocol-specific IP multicast transport objects including packets of media data are received from the IP multicast sender. Based on payload ID information, e.g., FEC payload ID, the packets are ordered and may be packaged into segments, fragments and/or particularly chunks. Therein, each segment, fragment and/or chunk comprises one or more frames of media data. Responsive to receiving a channel request from a client device for the live media stream, one or more HTTP headers are generated, and the chunks are served on a chunk-by-chunk basis to the client device via an HTTP chunked transfer encoding (CTE) session. The HTTP headers may therein be used by the client device for downloading the segment, fragment or chunk data from the IP multicast sender via the HTTP CTE session on a chunk-by-chunk basis for each segment.

In this method, the IP multicast sender may be an origin server as described above, i.e. for example an edge server associated with content distribution network (CDN), or a broadcast-multicast service center, BMSC, node of a mobile telecommunications network In the latter case, when the IP multicast sender is a BMSC node, an embodiment of the media delivery method may be a media broadcasting method operative in a mobile telecommunications network serving a plurality of wireless user equipment (UE) devices, each including a broadcast client. This method comprises, inter alia, receiving, at the broadcast-multicast service center (BMSC) node of the mobile telecommunications network, one or more fragments of each segment of a segmented media stream on a chunk-by-chunk basis via an HTTP CTE session with a media packager node, wherein each fragment is received before entire data of a segment is available at the media packager node. A FLUTE object may be created with respect to the media data. In one case, a FLUTE transport object may be created for each HTTP chunk. In another case, multiple HTTP chunks for a fragment may be collected and transmitted as a single FLUTE transport object. The one or more FLUTE objects may be transmitted to the plurality of wireless UE devices in a broadcast session, wherein the FLUTE object is associated with the segment's and chunk metadata through a File Delivery Table (FDT) instance. After all fragments (also referred to as "Chunks" in some arrangements and/or certain technical literature) for the segment have been received, a last chunk signal indication may be provided in the FDT instance to the plurality of the wireless UE devices. In one implementation, the FDT instance is extended to include a Chunk-Length parameter to identify that the media data of the segments is provided in chunked delivery, which may also be configured to indicate the size of the FLUTE object (e.g., in bytes). In a further variation, the FDT instance may be extended to include a Chunk-Offset parameter to indicate a relative location, e.g., in reference to a base locator. Each chunk may be carried as a FLUTE Transport Object having unique a Transport Object ID (TOI). When the sender collects all chunks of a fragment, then each fragment may be carried as a FLUTE transport object. Logically, in one arrangement, the transmitter is operative to create a new chunk by combining all chunks of a fragment into a new, larger chunk. The Chunk-Offset may be configured to identify the relative location of the data in the overarching segment. The Chunk-Offset and the Chunk-Size can be helpful in certain embodiments to detect missing chunks in the flow. In yet another aspect, there is disclosed an endpoint node associated with an IP multicast distribution network, comprising an IP multicast receiver. The endpoint node is configured to receive an IP multicast information message relative to distribution of media data of a live media stream from an IP multicast sender and IP multicast transport objects from the IP multicast sender, the IP multicast transmission objects including packets of media data. It is further configured to order the packets of media data based on sequential payload ID information, to generate chunks of media data based on the ordered packets and, responsive to receiving a channel request from a client for the live media stream, serve the chunks to the client device. In order to perform these functions, one or more processors may be foreseen which are operative to execute program instructions which may be stored in a memory, particularly a persistent, nonvolatile memory.

In one embodiment of the endpoint node, the IP multicast receiver may be integrated with a wireless UE device, particularly a UE operative to receive broadcast/multicast media in an LTE network. The UE device comprises, inter alia, an HTTP CTE encoding server or proxy and an evolved multimedia broadcast/multicast service (eMBMS) client that may include an IP multicast client resp. receiver and an HTTP CTE receiver. The UE device is configured to receive, at the IP multicast receiver, an IP multicast information message relative to distribution of media data of a segmented media stream from an IP multicast sender associated with a BMSC node, receive, at the IP multicast receiver, a plurality of FLUTE objects (e.g., one FLUTE object per each HTTP chunk, or one FLUTE object for all chunks of a fragment as set forth previously), each containing packets of media data for a fragment of a segment in the segmented media stream and to create chunks of media data based on the ordered packets. Optionally, chunks from multiple FLUTE objects may be combined to form segments of media data. Responsive to receiving a segment request from the HTTP CTE receiver, one or more HTTP headers may be generated, which may be utilized by the CTE receiver for downloading the segments from an HTTP CTE server via HTTP CTE session(s) on a chunk-by-chunk basis for each segment. The received chunk data may be provided to a media player buffer for rendering at a display of the wireless UE device.

In yet another aspect, there is provided a media streaming network, comprising a media ingest network portion configured to provide low latency uploading of media fragments of a segmented live media stream using HTTP chunked transfer encoding, CTE, wherein one or more fragments of a segment are ingested on a chunk-by-chunk basis before entire media data of the segment becomes available, an Internet Protocol, IP, multicast distribution network portion coupled to the media ingest network portion, the IP multicast distribution network portion configured to distribute chunked media data to one or more IP multicast recipients using an IP multicast protocol and a delivery network portion configured to deliver the media data to a client in an HTTP CTE download session with a serving IP multicast recipient. The media streaming network may comprise a media packager, origin server and/or endpoint node as described above.

Benefits of the present invention include, but are not limited to, providing a network architecture and associated systems and methods wherein transmission delay inside a CDN or a mobile broadcast network can be significantly reduced even where a reliable IP multicast protocol is used for media distribution. Accordingly, the benefits of IP multicast may be advantageously leveraged without negatively impacting user quality experience in wireline as well as wireless environments. Further, introduction of DASH/ISOBMFF carriage in an LTE broadcast deployment with low latency is also advantageous in public safety networks. Additional benefits and advantages of the embodiments will be apparent in view of the following description and accompanying Figures.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, element, virtual appliance, UE device, and the like, mutatis mutandis. Further features of the various embodiments are as claimed and defined in the dependent claims.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
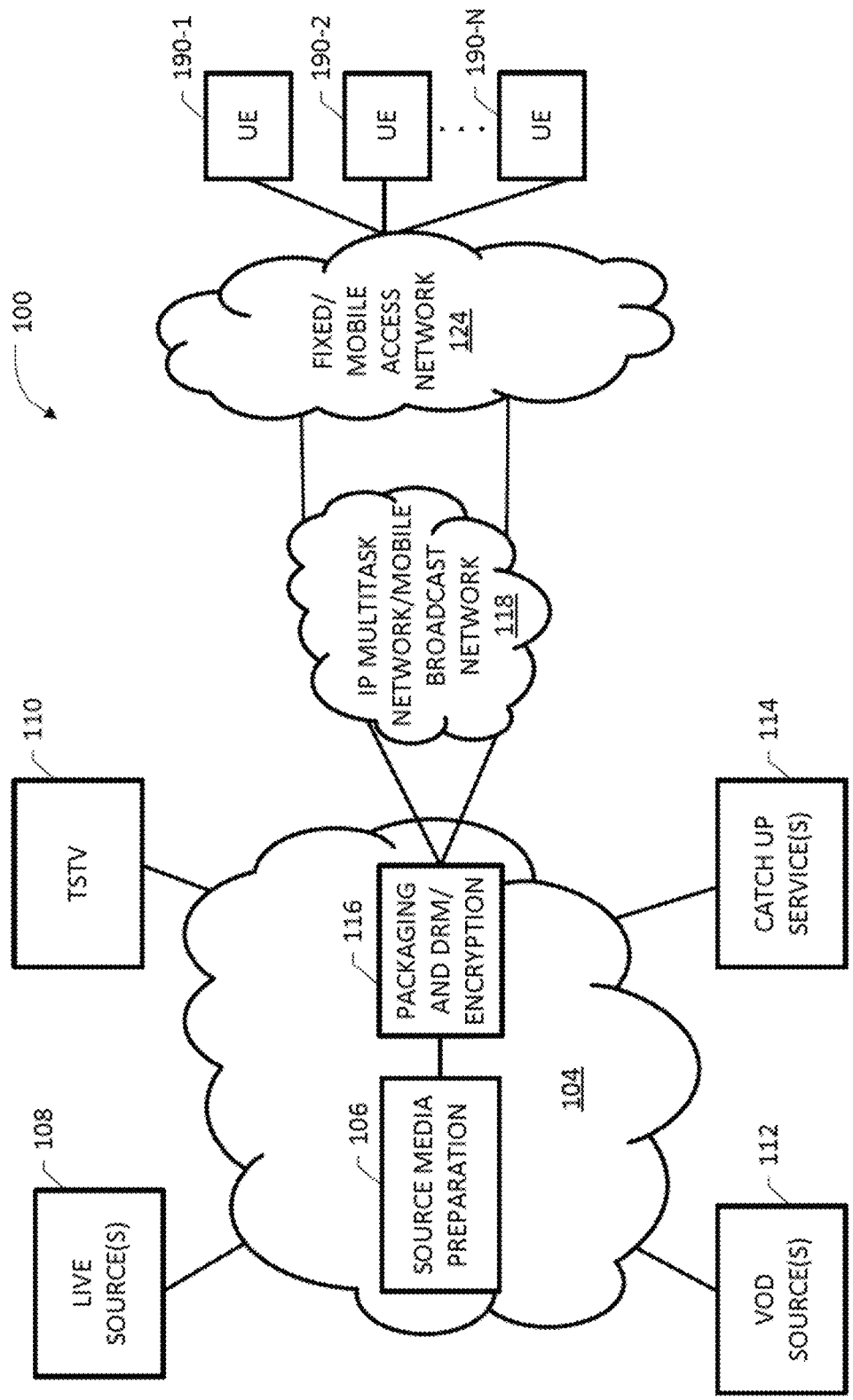
FIG. 1 depicts a generalized example network architecture wherein one or more embodiments of the present invention may be practiced for facilitating low latency media ingestions and distribution according to the teachings herein.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network element, node or subsystem may be comprised of one or more pieces of service network equipment, including hardware and software that communicatively interconnects other equipment on a network (e.g., other network elements, end stations, IP-STBs, legacy STBs, etc.), and is adapted to host one or more applications or services, either in a virtualized or non-virtualized environment, with respect to a plurality of subscribers and associated user equipment that are operative to receive/consume content in a media streaming network where media content assets may be uploaded, distributed and delivered using HTTP chunked delivery and/or IP multicast transport mechanisms. As such, some network elements may be disposed in a wireless radio network environment whereas other network elements may be disposed in a public packet-switched network infrastructure, including or otherwise involving suitable content distribution/delivery network (CDN) infrastructure and/or content source network (CSN) infrastructure. Further, one or more embodiments set forth herein may involve fixed carrier networks and/or mobile carrier networks, e.g., terrestrial and/or satellite broadband delivery infrastructures, which may be exemplified by a Digital Subscriber Line (DSL) network architecture, a Data Over Cable Service Interface Specification (DOCSIS)-compliant Cable Modem Termination System (CMTS) architecture, IPTV architecture, Digital Video Broadcasting (DVB) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., A/V media delivery policy management, session control, QoS policy enforcement, bandwidth scheduling management, content provider priority policy management, streaming policy management, and the like), in addition to providing support for multiple application services (e.g., data and multimedia applications). Example subscriber end stations or client devices may comprise various streaming-capable devices that may consume or deliver media content assets using streaming and/or file-based downloading technologies, which may involve some type of rate adaptation in certain embodiments. Illustrative client devices or user equipment (UE) devices may therefore include any device configured to execute, inter alia, one or more streaming client applications for receiving, recording, storing, and/or rendering content, live media and/or static/on-demand media, from one or more content providers, e.g., via a broadband access network, in accordance with one or more file-based ABR streaming technologies such as, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on, as well as MPEG Transport Stream (TS)-based streaming over Real-time Transfer Protocol (RTP) networks. Accordingly, such client devices may include legacy set-top boxes (STBs), Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) and the like, which may access or consume content/services provided via an IP multicast distribution network in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized example network architecture 100 for facilitating low latency media ingestion and distribution/delivery according to one or more embodiments of the present patent application. As will be seen below, content may be distributed and/or delivered using either multicast techniques or unicast techniques. In a unicast mechanism, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR (Adaptive Bitrate) streaming, which allows some form of rate adaptation. A given service may be encoded at a selection of different bitrates (known as representations, as noted elsewhere herein), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast distribution/delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM), Internet Group Multicast Protocol (IGMP), RTP/MPEG-TS over UDP and IP multicast for stream-based multicast, NACK-Oriented Reliable Multicast (NORM), File Delivery over Unidirectional Transport (FLUTE), FCAST, etc. When a receiver requests a given media item or asset, the network router system finds an existing stream of that content already in the network and directs a copy of it to that receiver from a serving cable headend, a video head office or an appropriately proximal network node in an edge distribution network. That is, multicast can be all the way from a headend packager or a national origin server (e.g., at a national data center) to a serving edge delivery node disposed in a suitable access network or at a premises network node, down to an end user station having appropriate IP multicast client functionality. The requesting receiver may be provided with the capability to join this existing stream under controlled conditions that do not adversely affect existing receivers. Any receiver in this group may also be provided with the ability to leave the stream, or pause its consumption, without affecting the others.

One skilled in the art will recognize that whereas "distribution" may be generally used to describe the provisioning of media within the core network and out to the edge servers, "delivery" of the media takes place between the edge server and the client, although such terms may be somewhat interchangeably used in the context of one or more embodiments of the present application. In general, the terms "media content," "digital asset", "content file", "media segments", or terms of similar import (or, simply "content") as used in reference to at least some embodiments of the present patent disclosure may include digital assets or program assets such as any type of audio/video (A/V) content that may comprise live capture media or static/stored on-demand media, e.g., over-the-air free network television (TV) shows or programs, pay TV broadcast programs via cable networks or satellite networks, free-to-air satellite TV shows, IPTV programs, Over-The-Top (OTT) and Video- On-Demand (VOD) or Movie-On-Demand (MOD) shows or programs, time-shifted TV (TSTV) content, Catch-up service content, Virtual Reality (VR) content, Augmented Reality (AR) content, ABR content, etc. By way of illustration, one or more live content sources 108, one or more TSTV content sources 110, one or more static/on-demand content sources 112 (e.g., VOD services and cloud/network DVR content sources), as well as Catch-up TV services 114 are shown in the network architecture 100 for serving as generalized content sources with respect to streaming media to a broad array of UE devices 190-1 to 190-N, at least some of which may be disposed in a subscriber premises and served by suitable premises equipment such as gateways, STBs, modems, etc. (not specifically shown). Media content assets from the content sources may be processed, encoded/transcoded and/or prepared by suitable media preparation facilities 106 in conjunction with packaging 116 coupled to or otherwise associated with a content source network 104 for transmission over an IP multicast distribution network 118. Further, appropriate digital rights management (DRM), encryption and digital watermarking (DWM) functions may also be configured to operate in association with packaging 116 with respect to the content media streams before uploading the packaged media to the IP multicast network 118 in certain embodiments. Various types of edge networks and access networks (fixed or mobile), cumulatively referred to by reference numeral 124, may be interfaced between UEs/premises nodes and upstream network elements in the respective distribution network infrastructures for facilitating media delivery over wired and/or wireless technologies, as noted previously.

An example media processing system associated with the content source network 104, e.g., at a global headend, may be configured to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., in addition to local and/or regional broadcasters, public safety networks, etc. In general operation, an example media preparation system 106 may be configured, under the control of one or more processors executing appropriate program code stored in a persistent memory module, to effectuate media preparation as follows. Initially, source media content is transcoded or otherwise encoded with different bit rates (e.g., multi-rate transcoding) using applicable encoder(s). For example, content of a particular media content asset or program may be transcoded into five video streams using variable bit rates (or, synonymously "bitrates" or "resolutions"), ranging from low to high bit rates (500 Kbps to 10 Mbps, by way of illustration). The particular content is therefore encoded as five different "versions", wherein each bitrate is called a profile or representation. A segmentation server or segmenter is operative as packager 116 for dividing each version of the encoded media content into fixed duration segments, which are typically between two and ten seconds in duration, thereby generating a plurality of segment streams and/or virtual segmented streams depending on implementation. One skilled in the art will recognize that shorter segments may reduce coding efficiency whereas larger segments may impact the adaptability to changes in network throughput and/or fast changing client behavior. Regardless of the size, the segments may be Group-of-Pictures (GOP)-aligned in an embodiment such that all encoding profiles have the same segments. Further, the packager 116 includes or operates in association with a media fragmenter configured to generate one or more fragments for each media segment, which may be for uploaded to suitable network nodes in the IP multicast network 118 using HTTP chunked transfer encoding (CTE) for low latency, as will be set forth in additional details hereinbelow.

Figure 2:
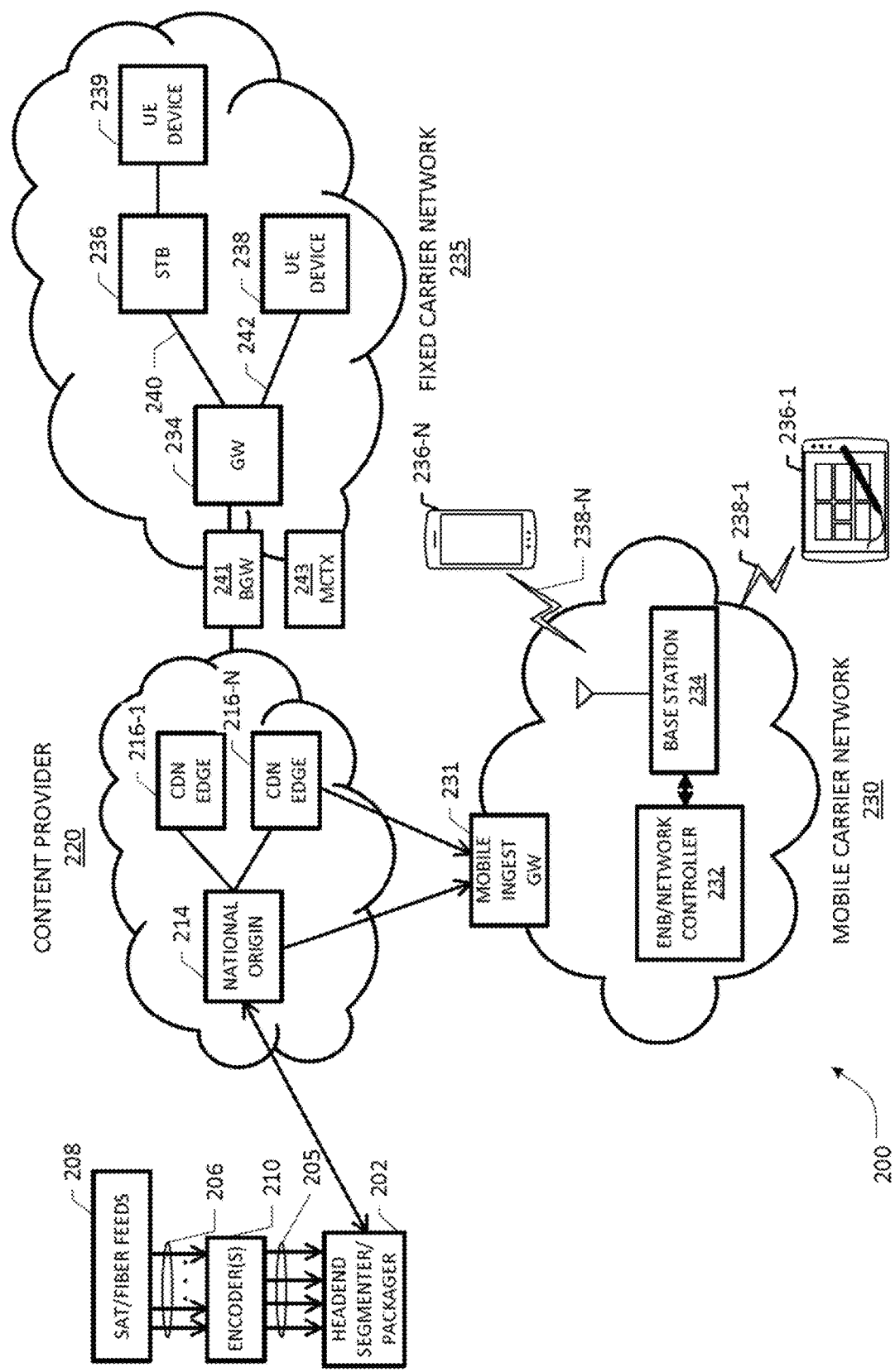
FIG. 2 depicts further aspects of the example network architecture of FIG. 1 illustrating additional details in an implementation.

FIG. 2 depicts further aspects of the example network architecture 100 of FIG. 1 illustrating additional details in an end-to-end implementation involving live media distribution and delivery using a fixed carrier network and/or a mobile carrier network in conjunction with one or more content service/provider networks. By way of illustration, a content provider network portion 220, a fixed carrier network portion 235 and a mobile carrier network portion 230 are exemplified in the network architecture 200. One skilled in the art will recognize that an example implementation 200 may be hierarchically organized where a headend or super headend facility of a national data center (NDC) is configured to encode and prepare the media into segments and sub-segments (i.e., fragments) and provide the fragments to centralized servers for distribution to end/edge receivers via one or more levels of intermediary network infrastructures (e.g., as part of a managed network infrastructure or a portion thereof, a mobile/fixed network portions, or a CDN) using IP multicast. Various user end stations having appropriate client applications are operative to download or pull the media segments from the IP multicast end/edge receivers using HTTP CTE-based delivery via one or more mobile/fixed access networks and home/premises networks, depending on where the IP multicast receiver functionality is implemented. As illustrated, a plurality of satellite or fiber feeds 208 provide source media content corresponding to one or more channels 206 to appropriate encoders 210, which encode/compress the media data into high quality bitrate streams 205, e.g., multicast streams or direct memory operations, in a standard container format such as, e.g., MPEG2-TS or M2TS according to ISO/IEC 13818-1 in one implementation. Packagers and encoders may also read the content from a local file system, instead of a satellite or fiber feed, in an additional or alternative arrangement. Although not shown in FIG. 2, one or more national splicers may be provided in an example embodiment for inserting any secondary media content, e.g., advertisements, into the media streams for processing by a headend encoder/transcoder/packager module 202, which may be distributed into multiple elements or components in some arrangements as part of a media server or system, and may be associated with additional nodes or elements such as ad servers (ADS), etc. Preferably, a transcoder component of the headend node 202 may be configured to generate a plurality of adaptive TS streams (ATS) as well as associated stream manifests with respect to each media content channel for multicasting, wherein ATS streams comprise specific bitrate representations of the media content asset of the channel, including encoding boundary points (EBP) or virtual segment information, secondary content signaling, e.g., SCTE 35 signaling, etc.

In one example implementation, at least a portion of the IP multicast network 118 of FIG. 1 may comprise the content provider network 220 which may be architected as an overlay CDN as exemplified in FIG. 2. As a CDN, the network 220 may comprise a multi-level, hierarchically-organized interconnected assembly of network servers for providing media pathways or "pipes" from one or more central distribution nodes (national origin servers) to one or more levels of regional distribution nodes that are connected to one or more local edge servers configured to serve a plurality of end users or subscribers in respective serving location areas via suitable access network infrastructures. It should be appreciated that a regional distribution node may operate as a parent node to one or more child edge/origin servers and a central or national distribution node may in turn operate as a parent node to one or more child regional distribution nodes for supporting an IP multicast distribution tree. Further, one skilled in the art will understand that a CDN architecture configured to support IP multicasting may be implemented as a public CDN, private CDN, or hybrid CDN, or a network of networks, which may include cloud-based infrastructures or data centers. By way of illustration, a national origin node 214 and nodes 216-1 to 216-N are exemplified as part of CDN 220, any of which edge nodes may be interfaced with the fixed network infrastructure 235 via suitable border gateway (BGW 241) coupled to MCTx 243 (Multicast Transmitter Function, which acts as ingest function into the fixed network). Additional example infrastructure elements such as DSLAMs, CMTS nodes, etc. are not explicitly shown. A subscriber premises gateway 234 (which may also include the Multicast Receiver Function or MCRx) for serving one or more STBs 236 and UE devices 238, 239 via a premises network 240, 242 is illustrative of a customer-side portion of the infrastructure. It should further be appreciated that the Multicast receiver function is also be collocated with a STB in an additional or alternative implementation.

One skilled in the art will recognize that in addition to media distribution servers (sometimes also referred to as "content delivery nodes"), a CDN may also include and/or interoperate with various network elements configured to effectuate request redirection or rerouting mechanisms as well as related back office systems such as subscriber management systems, bandwidth scheduling systems, account/billing systems and the like, that may be deployed as part of a media streaming network back office (not specifically shown).

In an additional or alternative embodiment, a mobile ingest gateway 231 of the mobile carrier network 230 may be coupled to one or more nodes of the content service network 220, e.g., origin server 214, edge server 216-N, for receiving media fragments in any number of data transfer mechanisms, e.g., triggered push, pull, and/or hybrid transfer mechanisms. In a still further embodiment, the headend packager/segmenter source node 202 may be configured to upload, transfer, transmit, or otherwise provide the media fragments to the mobile ingest gateway 231. In one arrangement, the mobile ingest gateway 231 may be configured to operate as a suitable broadcast/multicast service node of the carrier network 230 adapted for facilitating IP multicast distribution according to the teachings set forth in detail below. In another arrangement, the mobile ingest gateway 231 may download segments and fragments, triggered by the timing and URL descriptions from a manifest file. A plurality of exemplary wireless or mobile devices or user equipment (UE) devices 236-1 to 236-N are shown as being operational in the wireless environment of the exemplary mobile carrier network 102. In the discussion herein, the terms "wireless network," "mobile network," "mobile communication network," "carrier network", or terms of similar import may be used interchangeably to refer to a wireless communication network (e.g., a cellular network, a proprietary data communication network, a corporate-wide wireless network, etc.) that facilitates voice, data, and/or multimedia communications with different types of untethered devices (e.g., devices 236-1 to 236-N). In one embodiment, such devices may comprise smartphones, tablets, mobile computers/laptops, notebooks, e-readers, personal digital assistants (PDAs), VR/AR gaming devices, etc., capable of receiving adaptively streamed AN content from the network 230 in a broadcast/multicast delivery session and playing it using a local ABR client/media player executing thereon.

The wireless UE devices 236-1 to 236-N are shown to be in wireless communication (via respective radio links 238-1 to 238-N) with the wireless network 230 through one or more base stations, e.g., base station (BS) 234, operative to provide air/radio interface (in the form of suitable Radio Frequency (RF) links depending on the particular mobile communications technology) to devices 236-1 to 236-N via appropriate antenna elements. By way of example, the base station 104 may comprise a node in a 3rd/4th/5th-Generation or Next Generation network, and may be interfaced or integrated with a network controller node 232 operatively coupled to the mobile ingest gateway 231. For instance, the example wireless carrier network 230 may comprise a Long Term Evolution (LTE) network, which infrastructure will be described in further detail below for purposes of an embodiment of the present invention.

It will be recognized that although not specifically shown in FIG. 2, an example untethered UE device may also download media using short-range radio communications (e.g., IEEE 802.11b, IEEE 802.11a, IEEE 802.11g, HiperLan and HiperLan II standards, Wi-Max standard, OpenAir standard, Bluetooth standard, etc.), via suitable hot spots or access points in a WiFi network for instance. In a still further embodiment, a DVB architecture may be implemented that involves at least portions of the network infrastructure components shown in FIG. 2. In a still further arrangement, the mobile ingest gateway 231 may interface with the segmenter/packager node 202, additionally or alternatively to the arrangements set forth above for receiving media segments, fragments and/or chunks.

Figure 3A:
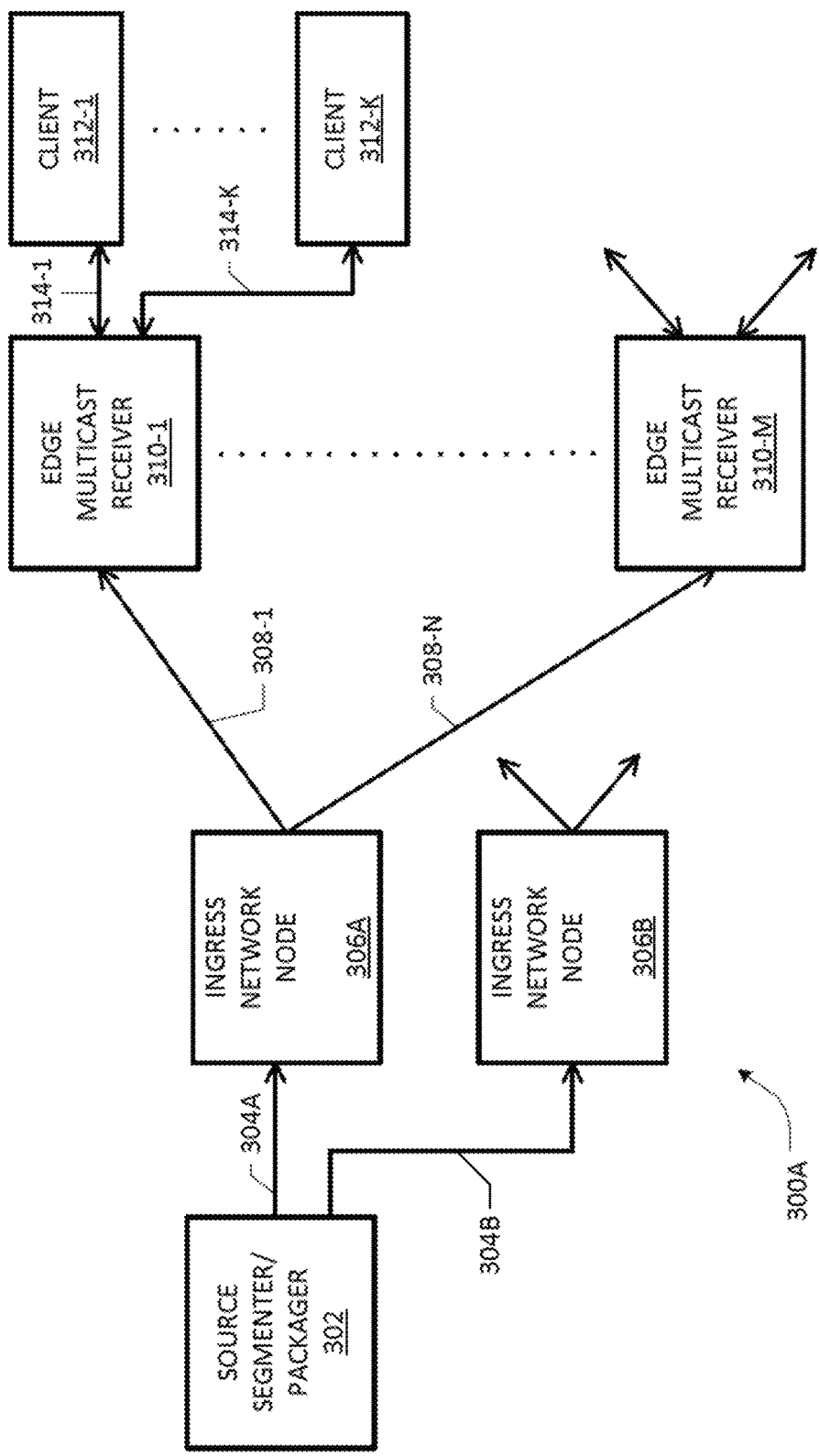
FIG. 3A depicts an example high-level multicast network for practicing an embodiment of the invention.

FIG. 3A depicts a high-level representation of an example multicast network environment 300A for practicing an embodiment of the present invention. Skilled artisans will appreciate that the multicast network environment 300A is an abstracted version of the networks 100 or 200 set forth above, simplified herein so as not to distract from the key components and concepts relevant to an exemplary embodiment. Broadly, the network environment 300A is comprised of a media ingest portion 304A, 304B, a distribution portion 308-1 to 308-N, and a client delivery portion 314-1 to 314-K, wherein media ingest network portion 304A/304B and client delivery portion 314-1 to 314-K may be effectuated using HTTP CTE-based data transfer mechanisms in one example embodiment. In further embodiments, media ingest network portion 304A/B may be configured to effectuate any suitable media data transfer mechanism, e.g., push/pull, triggered push/pull, to transfer or otherwise provide media data to one or more media ingress network nodes as will be set forth below. Accordingly, it should be appreciated that the terms "ingest" or "ingesting" or related variants may include any type of data transfer mechanism, including CTE, for purposes of transferring media data to an ingest node according to the teachings herein. In one embodiment, the distribution network portion 308-1 to 308-N may be based on reliable IP multicast transport using a suitable IP multicast protocol such as NORM, FLUTE, FCAST, etc. Preferably, the IP multicast transport mechanisms are extended or otherwise modified in accordance with the teachings herein to facilitate media distribution from an upstream network element to which the media is uploaded or otherwise provided even before entire media data for segments becomes available.

A source segmenter/packager node 302 includes a processing functionality for fragmenting each media segment into multiple fragments, each fragment comprising one or more frames of audio, video and/or A/V data, and for ingesting the fragments to one or more network elements 306A, 306B operative as IP multicast ingress nodes, using respective HTTP CTE sessions established therebetween. In one embodiment, the network element 306A/306B may comprise a CDN origin server (e.g., a national origin node, a regional distribution node, or an edge distribution node, depending on which node is provided as the IP multicast ingest point). In another embodiment, the network element 306A/306B may comprise an LTE broadcast/multicast service center (BMSC) node. One or more edge multicast receivers 310-1 to 310-M may be disposed as end points of the IP multicast network 308-1 to 308-N for receiving media data in protocol-specific IP multicast transport objects. Various client applications (or clients for short) 312-1 to 312-K are operative, in tethered and/or untethered environments, to download media data from the edge receivers 310-1 to 310-M using HTTP chunked delivery via respective HTTP CTE sessions, depending on which IP multicast groups they are joined. It should be noted that the media content may be packaged in a way to benefit from HTTP CTE delivery. As noted elsewhere in the present patent application, the IP receiver functionality may be co-located or otherwise integrated at different levels, e.g., end user stations, STBs or gateways, and may further be integrated with HTTP CTE receiver functionality and/or media player functionality, depending on implementation.

Figure 3B:
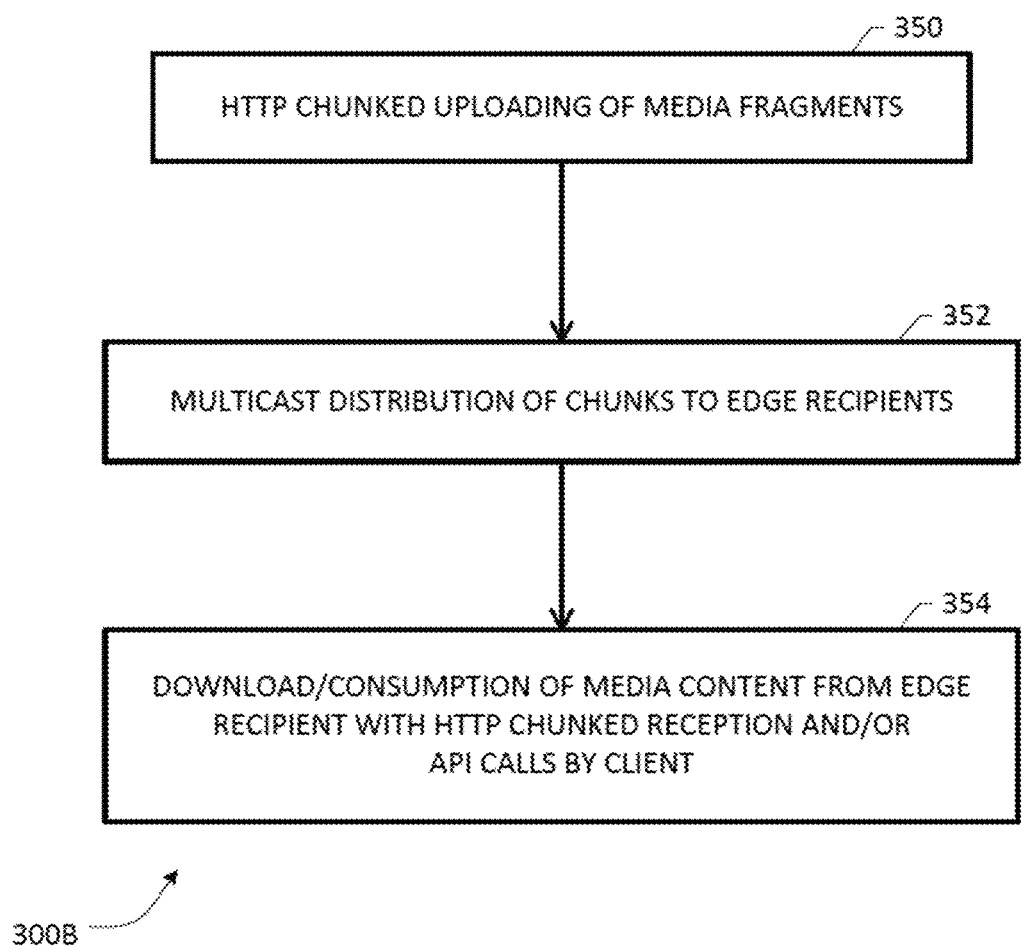
FIG. 3B is a flowchart of steps, blocks or acts that may be refined, combined, or arranged into one or more embodiments and/or additional flowcharts for facilitating low latency media ingestion and distribution in the example high-level multicast network shown in FIG. 3A.

FIG. 3B is a flowchart of a high-level scheme 300B comprising steps, blocks or acts that may be refined, combined, or (re)arranged into one or more embodiments and/or within additional flowcharts for facilitating low latency media ingestion and distribution in an end-to-end flow in the example high-level multicast network shown in FIG. 3A. At block 350, a content source network node is configured to create multiple data fragments for each media segment and for uploading or otherwise ingesting of media fragments (e.g., as they become available in a live media service), e.g., using chunked delivery to an HTTP CTE server node associated with an IP multicast ingest point. Multicast distribution of the chunked media is facilitated by way of generation and transmission of suitable IP transport objects to one or more edge IP multicast receivers (i.e., recipients), as set forth at block 352. Download/delivery of media content from the edge recipients is effectuated by one or more clients (block 354), which may be an HTTP CTE-based mechanism identical to the CTE mechanism used for media uploading at the content source network node, or a different CTE mechanism (e.g., using different chunk sizes), or a normal HTTP data transfer mechanism (e.g., for legacy client applications). Further, depending on where the IP multicast receiver functionality is integrated (e.g., the media player directly consuming IP multicast transport objects), a media player or client application may be configured to use direct application programming interface (API) calls, subroutines, protocols, functional calls, etc. to emulate "HTTP like" file operations to obtain the media data for playback, as set forth at block 354. Accordingly, in such an embodiment, the receive functionality associated with block 352 and consumption functionality of block 354 of the exemplary end-to-end process 300B may be combined in a single UE node which operates as the IP multicast endpoint of an IP multicast tree for a requested media channel.

One skilled in the art will recognize that the different media download/consumption sessions between the edge recipients and associated clients may take place asynchronously with respect to one another. In similar fashion, data relative to various media channels may be uploaded from one or more frontend media uploading packagers to an IP multicast ingest point in different HTTP CTE upload sessions executing via different network ports/interfaces, independent of whether one or more clients are joining or tuning to the multicast groups associated with the media channels.

In an example embodiment, therefore, chunked transfer encoding may be provided as part of block 350 as a data transfer mechanism in HTTP ver. 1.1 in which media data may be sent in one or more "chunks" for each fragment of a segment of the media channel stream across all bitrate representations provisioned in the network (e.g., standard definition (SD) quality, high definition (HD) quality, ultra HD (UHD) quality, 4K quality, etc.). In one implementation, the CTE-based data transfer mechanism may use the Transfer-Encoding HTTP header in place of the Content-Length header, which is normally required in a typical HTTP session. Because the Content-Length header is not used, a sender does not need to be aware of the length/size of the content before transmitting to a receiver. In one implementation, the size of each chunk may be signaled at a suitable point in time of transmission (e.g., configurable) so that an HTTP CTE receiver can determine when the complete chunk has been received. For instance, the chunk size may be transmitted just prior to transmitting the chunk itself in an illustrative embodiment. In a further embodiment, the data transfer may be terminated by a final chunk of zero length.

In a further embodiment, a CTE-based transfer mechanism may be configured for supporting and maintaining an HTTP persistent connection between an uploading packager and an origin server, for example, preferably for dynamically generated content. One skilled in the art will also appreciate that chunked encoding may be configured for allowing a sender to send additional header fields after the message body in certain embodiments, which can be advantageous in cases where values of a field cannot be known until the content has been produced, e.g., when the media content needs to be digitally signed or watermarked.

In an example CTE formatting scheme, if a Transfer-Encoding field with a value of "chunked" is specified in an HTTP message (either a request sent by a client or the response from the server, where the client and server are designated endpoints of an HTTP CTE session), the body of the message may contain unspecified number of chunks, a terminating chunk, trailer, and a final CRLF (carriage return followed by line feed) sequence. Each chunk may start with a number of octets of the data it embeds, expressed as a hexadecimal number, for example, followed by optional parameters (e.g., chunk extension parameters) and a terminating CRLF sequence, followed by the chunk data, wherein the chunk is terminated by CRLF (e.g., operative as a chunk boundary marker). If chunk extensions are provided, the chunk size may be terminated by a semicolon and followed by the parameters, each also delimited by semicolons. Each parameter may be encoded as an extension name followed by an optional equal sign and value, which may be used for supporting additional services, e.g., running message digests or digital signatures, indications of estimated data transfer progress, etc. The terminating chunk may be provided as a regular chunk, but having a chunk length of zero, which may be followed by one or more trailers.

It will be realized upon reference hereto that an embodiment of the present invention provides an exchange-to-exchange (E2E) delivery/distribution system for low delay delivery of media segments (e.g., DASH segments) through a fixed or mobile distribution network, which utilizes IP multicast to send the content from the origin node to the edge recipient stations. Broadly, in one example implementation, a live segmenter/packager (also referred to as a content source node) may be configured to create relatively large segments, e.g., 5 seconds in duration. Each segment may be subdivided into a plurality of fragments that are uploaded using HTTP CTE. For instance, a fragment may contain only a single media sample like a coded video frame, e.g., an Instantaneous Decoder Refresh (IDR) frame (a special kind of I-frame), although other variations are possible.

Skilled artisans will appreciate that for low latency live communication using DASH/ISOBMFF, for instance, an example segmentation/fragmentation process may be configured to generate relatively short fragments built from frames, where a GOP may be separated into two or more fragments. The segmenter/packager node may be configured to make content available only when all frames (video pictures and/or audio samples) for that fragment of the segment have been completely received from the live source. A GOP may be provided as a coded sequence of video pictures between two key frames (e.g., IDR frames), wherein a decoder can start decoding of the video sequence of the GOP only with the key frame followed by one or more delta frames. In one extreme case, the segmenter/packager can generate a new fragment for each new frame, so that the fragment becomes available once all data of the frame is available to the segmenter. It should be appreciated that in such a case, all the P-frames and B-frames are also packaged into individual fragments.

With respect to the example end-to-end network environment 300A shown on FIG. 3A, it will be realized that whereas reliable IP multicast distribution is used inside a distribution network (e.g., a CDN) to carry objects from the HTTP origin server to the IP multicast edge, nodes such as live encoders/segmenters as well as HTTP clients are external to that network and may not necessarily be aware of the usage of IP multicast inside of the CDN.

As at least some example embodiments of the present invention particularly relate to ISOBMFF, a brief overview is set forth immediately below. ISOBMFF defines a general container or wrapper structure in a flexible, extensible format that facilitates interchange, management, editing and presentation of time-based multimedia files such as audio and video, which may form a basis for other container formats, wherein the presentation may be local, or via a network or other file-based delivery mechanism. In general, the media file format sets forth an object-oriented file structure and contains the timing, structure, and media information for timed sequences of media data, such as audio-visual presentations. A file can be decomposed into basic objects wherein the structure of the objects may be implied from their type. Files conforming to the ISOBMFF standard (ISO/IEC 14496-12, incorporated by reference herein) are formed as a series of objects, referred to as "boxes", wherein all data is contained in boxes and there may be no other data within the file. The "box" is an object-oriented building block defined by a unique type identifier and length. A presentation (motion sequence) may be contained in several files. All timing and framing (position and size) information must be in the ISO base media file and the ancillary files may essentially use any format to the extent they are capable of description by the metadata defined in ISO base media file format. In order to identify the specifications to which a file based on ISOBMFF complies, brands may be used as identifiers in the file format, which may be set in a box named File Type Box ("ftyp"), or a "styp" in case of media segments, which must be placed in the beginning of the file. A file that supports streaming includes information about the data units to stream (e.g., how to serve the elementary stream data in the file over streaming protocols). Additional boxes relating to streaming include "moov" box, "mdat" box, "moof" box, etc., which may be provided as part of a low latency ISOBMFF fragment for purposes of the present invention as will be set forth below. It should be noted, that the segment or file type box (styp) or other additional ISO-BMFF boxes may be provided with the first fragment in the same HTTP chunk, or may be provided through separate HTTP chunks. The styp box indicate information about the fragment and segment structure and some compatibility information.

Where an example embodiment involves a live DASH segmenter as the source node 302, it may be configured to use ISOBMFF as segment format, although other segmentation/formatting schemes may be used also (e.g., Common Media Application Format (CMAF) format as well as other types of HTTP Adaptive Streaming (HAS) format, etc.). As noted previously, IP Multicast receivers may often located at a CDN edge, which can be located at different levels, e.g., in the home gateway or even co-located with the client on the same physical UE device or appliance. In an example implementation, the source node 302 may be configured to receive a continuous media stream of each multiple bitrate representation of a live media channel and segment it into individual media segments, and further subdivide a segment of a segmented media stream into multiple fragments. For example, a 5-second segment can contain 5 fragments, each containing 1-second of media data, e.g. a full GOP. For low latency, a fragment may contain only a fraction of a GOP. As an illustration, where an encoder produces a stream with 1-second GOP, segmenter 302 may be configured to create 5-second segments, each containing ten 0.5-second fragments (i.e., half a GOP).

In one embodiment, the live segmenter/packager 302 is operative to upload the content location information, e.g., a uniform resource locator (URL) of a file, with initial HTTP PUT or POST operations to the origin server operating as or in association with an IP multicast ingest point; this can be considered an example for a push mechanism as described above. Responsive thereto, the origin server may be configured to notify the edge recipient node about the newly received HTTP media resource, although the file size and the actual content are not received. In general, the edge recipient nodes can be configured to start serving any request from HTTP clients as soon as the HTTP media resource information (e.g., the URL) is known to the edge recipient node, e.g., preferably by way of an HTTP CTE mechanism since the edge recipient node does not know the actual file size and nor does it have the actual data available.

As noted previously, the live segmenter/packager 302 is operative to create a plurality of segments of a media stream across multiple bitrate representations, wherein each segment may contain one or more fragments. In one example embodiment, the segmenter/packager node 302 may be configured to send each fragment as one or more HTTP chunks as soon as the data for the fragment becomes available. As a result, the segmentation delay is reduced in the uploading process, since the segmenter/packager does not have to wait for the entire segment to be created. In accordance with the teachings herein, an IP multicast sender associated with the HTTP CTE server of the origin node is operative to start creating a new IP multicast transport object for each fragment or each HTTP chunk of a new segment (i.e. when new HTTP resource information is received), wherein the fragments are uploaded in HTTP chunks. Further, the multicast sender may also be configured to continuously write the chunks (e.g., after a short buffering in some example implementations) into corresponding transport objects, which may involve removing the chunk headers in some example implementations. When an empty chunk is received, the multicast sender is operative to determine the file fragment size by summing up all previously received chunk sizes, which may be signaled by sending a boundary flag to indicate a "last packet" and start a new transport object. It should be appreciated that various other methods to indicate a "last chunk" may be implemented within the scope of the present invention.

Figure 4A:
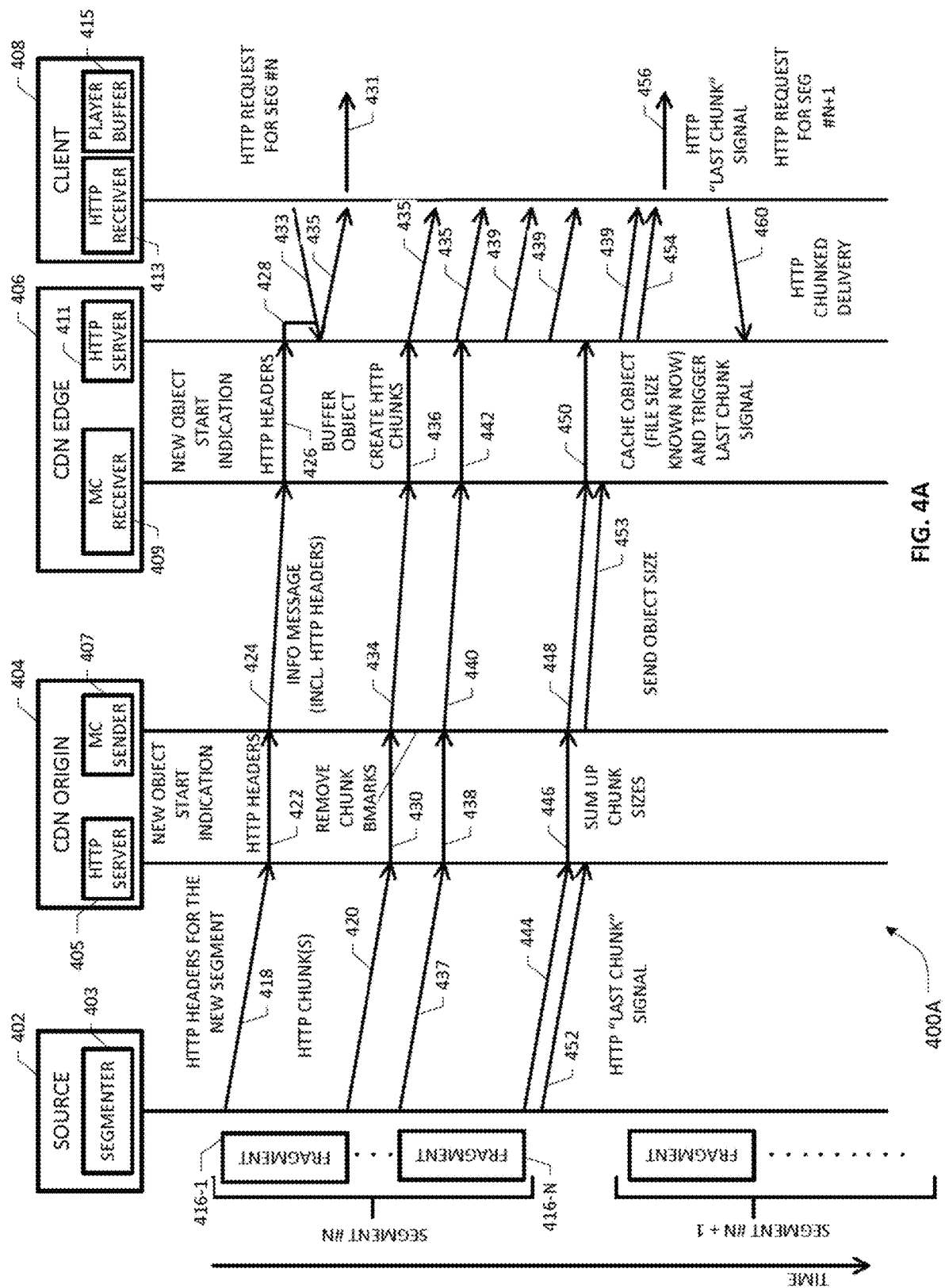
FIGS. 4A-4C depict message flow diagrams depicting media ingestion and distribution in a CDN-based implementation according to an example embodiment.
Figure 4B:
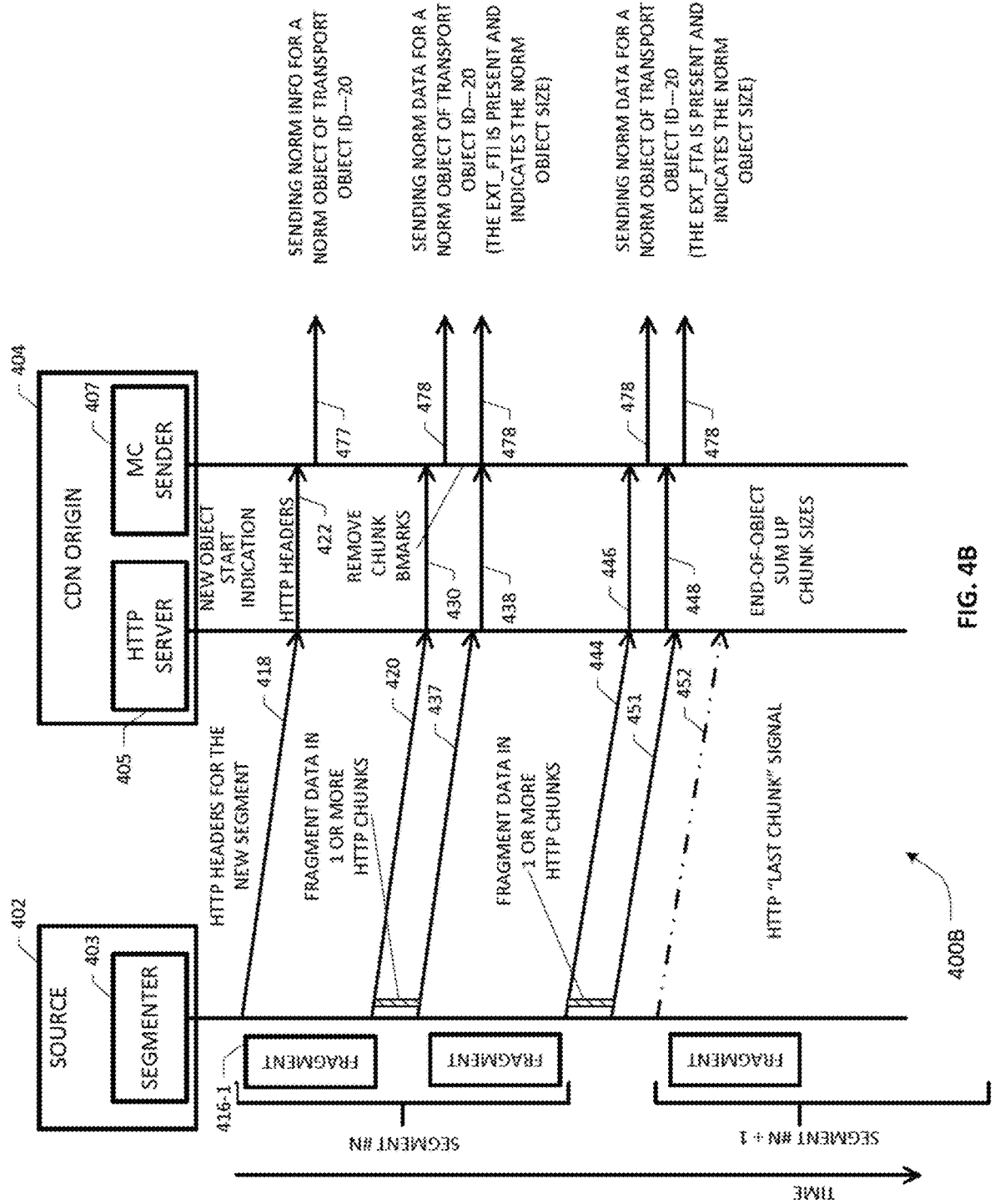
Figure 4C:
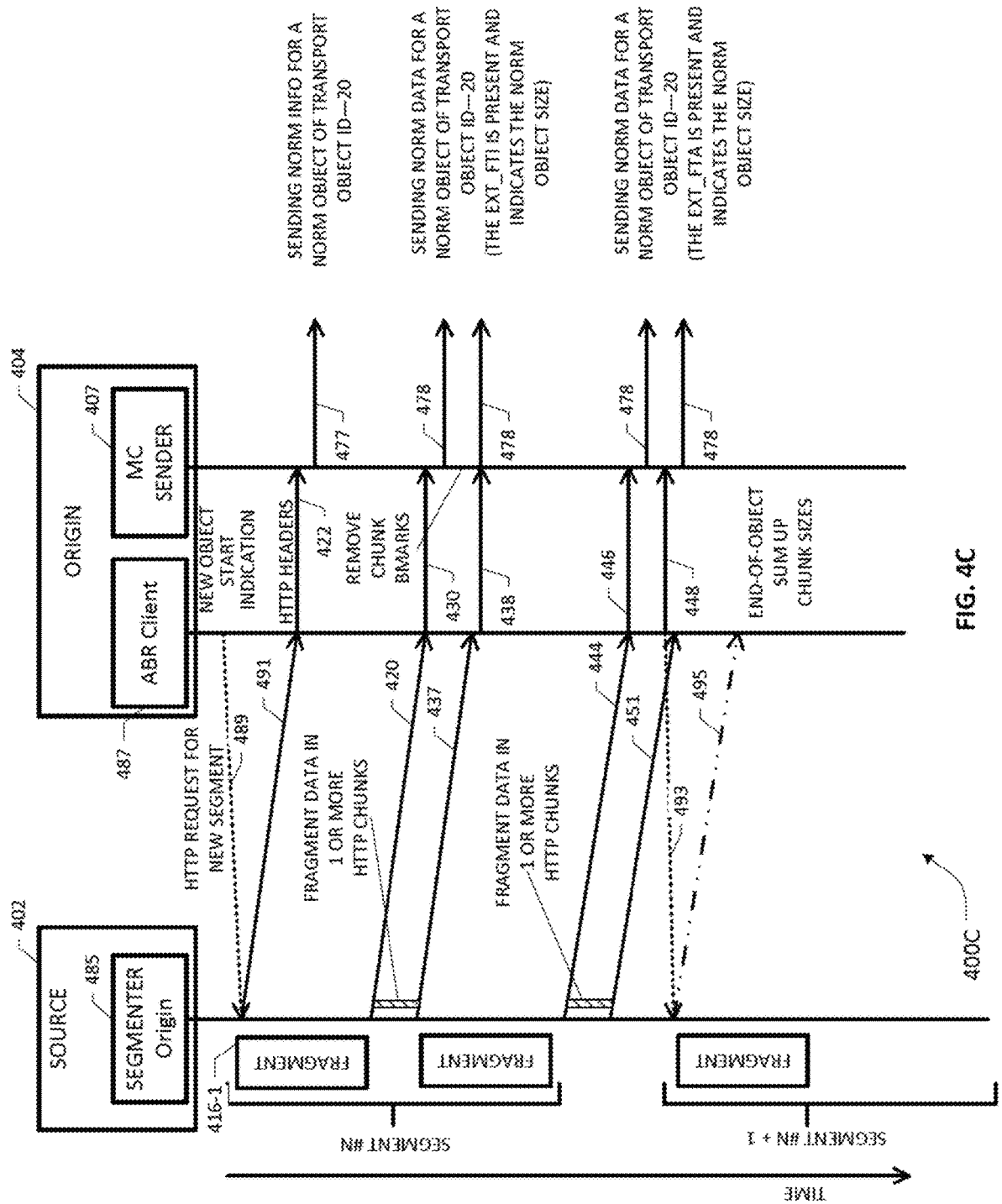

Turning to FIGS. 4A-4C, depicted therein are message flow diagrams illustrating low latency media ingestion and distribution in a CDN-based implementation according to an example embodiment of the overall scheme set forth hereinabove. In particular, reference numeral 400A in FIG. 4A generally refers to a message flow relative to an end-to-end process of media uploading, distribution and delivery with respect to a CDN-based IP multicasting architecture. An example source network or node 402 includes segmenter (also called a packager) 403 operative to effectuate an HTTP CTE session with a CDN origin node 404 that may include an HTTP CTE server 405 and a multicast (MC) sender 407, which may be architected as a distributed computing platform in one embodiment. A CDN edge node 406 likewise may include an MC receiver 409 and an HTTP CTE server 411. A UE device capable of HTTP chunked delivery may be provided with a client 408 including an HTTP CTE receiver 413 and a media player/buffer 415. Although a single CDN edge node 406 and a single UE/client 408 are exemplified in FIG. 4A, skilled artisans will understand that a plurality of CDN edge nodes, each serving one or more UE/clients, may be provided in a CDN-based IP multicasting architecture.

In one arrangement, the segmenter 403 may be configured to load or otherwise transmit each fragment of a segment using HTTP CTE to the origin node's HTTP CTE server 405 as soon as the fragment becomes available. As noted previously, a segment may be subdivided into a plurality of fragments, e.g., fragments 416-1 to 416-N for Segment #N, wherein each fragment may be uploaded or otherwise provided to the HTTP CTE server 405 using one or more chunks. The Segment Url (also referred to as HTTP object URL) and one or more HTTP headers 418 with respect to commencing a segment transmission may be provided to HTTP CTE server 405, which may be propagated as segment url and HTTP headers 422 to the MC sender facility 407 based on a new object start indication provided thereto. The benefit of sending the segment URL and the HTTP headers for the newly created segment earlier than the first fragment (i.e. at the time, when the last segment is finalized and the segmenter turns to the next segment) is that downstream nodes become earlier aware about newly created segment. Further, in some cases it may be beneficial to send also some additional metadata like the styp box as very first HTTP chunk with the headers and the segment url, so that any client can already request a portion of binary data. By way of illustration, reference numerals 420, 437, 444, 451 refer to chunk transmissions between segmenter 403 and HTTP CTE server 405 with respect to the fragments 416-1 to 416-N of Segment #N, preferably using suitably formatted CTE messages as set forth hereinabove for carrying the media data. It should be noted that media data in HTTP chunks are only provided during time between 420 and 437 (and later between 444 and 451). The Segmenter node 403 is not sending media data between 418 and 420 (and later between 437 and 451). When the segment contains more than two fragments or when the segmenter 403 is subdividing a fragment into more HTTP chunks, then the procedure is repeated accordingly, as exemplified in FIG. 4B, for instance.

In one example embodiment, when the source node 402 starts a new segment (e.g., Segment #N), appropriate service logic associated with the source node 402 is operative to include various pieces of metadata information in HTTP headers 418, e.g., information relating to MIME Type, content location (i.e., segment URL, which may be relative to or indexed from a base URL), etc., in an initial transmission to the origin sever 404. In a further embodiment, the HTTP headers 418 may also include an indication of HTTP chunked transfer encoding for segment upload. In one arrangement, after the source node 402 has indicated the creation of a new segment and has provided the HTTP headers and the segment URL (as part of the HTTP method line), the source node 402 is operative to collect/process all data for the fragment. It should be appreciated that during this data collection phase, the source node 402 may not be sending media data. Accordingly, in such a scenario, the source node 402 may be configured to start sending the data of a fragment using one or more HTTP chunks only after the source node 102 has created the according fragment. Optionally or alternatively, the source node 402 may be configured to delay the indication of a new segment creation (i.e. the HTTP Method with the HTTP URL and the HTTP headers) until the data for the first fragment is available.

As illustrated in FIG. 4A, a "last chunk" signal 452 may be provided to the origin server node by the source node 402 after all the fragments of a segment (e.g., Segment #N) have been uploaded. Prior to receiving the last chunk signal 452, appropriate service logic executing at the CDN origin node 404, e.g., in association with the constituent HTTP CTE server 405 component and/or MC sender component 407, may be configured to effectuate various communications, signals and/or messages between the components of the CDN origin node 404, e.g., HTTP CTE server 405 (which may be referred to as an upstream HTTP CTE server) and MC sender 407, for processing the received metadata (e.g., HTTP headers) as well as HTTP data chunks for downstream transmission via suitable IP multicast as soon as the relevant information is available. Transmission or propagation of the HTTP headers 422 as well as transmission or propagation of chunked data with respect to one or more fragments 416-1 to 416-N, as exemplified by chunk data transmissions 430, 438, 446, are illustrative in one example embodiment. Further, the service logic executing at the CDN origin node 404, e.g., in association with MC sender 407, may be configured for generating appropriate IP multicast transport objects (e.g., depending on the IP multicast protocol(s) configured for the CDN origin server 404), which may be configured to carry HTTP header information and media data, to the MC receiver 409 associated with CDN edge node 406, as will be set forth in additional detail below. By way of illustration, transmission 424 is illustrative of carriage of HTTP header information in a suitably packetized transport object in accordance with the IP multicast protocol being used. Likewise, transmissions 434, 440, 448 are illustrative of carriage of media data of a partial segment, again in suitably packetized transport objects in accordance with the IP multicast protocol being used. Appropriate service logic executing at the CDN edge node 406, e.g., in association with the constituent MC receiver component 409 and HTTP CTE server component 406 (which may be referred to as a downstream CTE server) and/or MC sender 407, may be configured to effectuate various communications, signals and/or messages between the components of the CDN edge node 406, e.g., HTTP CTE server 411 and MC sender 409, for processing the received metadata (e.g., HTTP headers) as well as media data in transport objects, depending on where the MC receiver functionality is located/integrated, whether a client is capable of directly consuming IP multicast objects, etc. As illustrated in FIG. 4A, HTTP headers may be provided to the downstream HTTP CTE server 411 by way of a transmission 426, objects may be buffered at the server buffer by way of a storage action 428, and HTTP chunks may be created for the multiple fragments of the segment, as indicated by reference numerals 436, 442, 450, with respect to downstream delivery to the client 408 when there is a request for the media (e.g., the client tuning to or switching to a channel corresponding to the live media stream). One skilled in the art will recognize that received media data chunks/segments may be stored at storage locations identified according to the HTTP header information, e.g., at relative URLs indexed from a base URL for a segment, either at the edge node 406 and/or some other media storage node associated therewith.

As previously noted, UE/client side operations relative to requesting and downloading of media data may be effectuated using HTTP CTE data transfer mechanisms (e.g., by a CTE-compliant UE/client application) or normal HTTP mechanisms (e.g., by a legacy UE/client application). In the illustrative embodiment of FIG. 4A, appropriate service logic associated with the CTE-compliant client 408, e.g., in association with the HTTP CTE receiver 413, is operative to generate an HTTP CTE request 433 for the segment (e.g., based on a manifest file or MPD received via an out-of-band or in-band transmission mechanism; the MPD contains information that the client could start fetching segments before the segments are completely available), whereupon the media data of the segment is provided via HTTP chunked delivery in a plurality of chunk transmissions, e.g., chunk transmissions 435 relative to the fragment 416-1 and chunk transmissions relative to the final fragment 416-N. As indicated by reference numeral 431, the received media data may be provided to the media player's buffer 415 for rendering at a suitable display.

In one example embodiment, the service logic executing at the CDN origin node 404 is operative for removing chunk boundary marks with respect to the HTTP chunks uploaded from the source node 402. In one example embodiment, responsive to the last chunk signal from the source node 402, the CDN origin node 404 may be configured to sum up the sizes of all chunks to generate an object size indication 453 associated with the segment for signaling the object size indication to the edge multicast receivers, e.g., CDN edge node 406. In another embodiment, chunk boundary indications may be provided to the MC receiver 409 of the CDN edge node 406, which can sum up all the fragment sizes. Once the file size is known to the CDN edge node 406 (either by explicit signaling from the CDN origin server 404 or via an internal determination by the MC receiver), a "last chunk" signal 454 may be generated to the client 408, which may be propagated to the media player as indicated by signal 456. Depending on client configuration, an HTTP request 460 for a next segment (e.g., Segment #N+1) may be based upon the receipt of the propagated last chunk signal 456. In another example embodiment, the client may be configured to generate next segment requests 460 at preconfigured intervals without the need for receiving a last chunk signal 456.

In FIG. 4A and FIG. 4B, the CDN origin 404 uses the Push Base url to determine associated base IP Multicast transmission information, such as IP Multicast address, UDP port and protocol (NORM or FLUTE). A Push Base Url can be compared with a directory folder in a file system, where all files or object in that folder are associated with a transmission. A separate controller node typically provides the push base URL and the associated IP Multicast transmission parameters. The CDN origin node associated a Multicast Sender function (407) to each Push base URL and may replace the push base URL part with a visible url. For each received individual segment & chunk, the Multicast Sender Function (407) is then assigning a unique Transport Object identifier.

With respect to IP multicast distribution within the CDN, an example embodiment involving NORM (RFC 5740, incorporated by reference herein) is set forth in additional detail hereinbelow. In one embodiment, the MC sender 407 may be configured to create a NORM Transport Object for each HTTP chunk, regardless of whether an HTTP chunk contains a full fragment or a partial fragment. Whether an IP transport object contains a full fragment or partial fragment may not have a significant impact in a wireline environment, e.g., DSL/cable network, where transmission speeds are generally higher and packet loss is minimal (i.e., data is recoverable). On the other hand, in mobile telecommunications networks where mobile UE devices cannot readily establish uplinks, losses involving partial fragments are usually not recoverable, thereby potentially causing synchronization issues at the player side, especially where key frames such as IDR or I-frames are lost. As will be set forth below, additional refinements regarding IP multicast distribution in an exemplary LTE mobile telecommunications network are disclosed according to an embodiment of the present invention. One skilled in the art will recognize, however, that at least some aspects of the IP multicast distribution scheme described herein may also be applicable to a mobile-network-based IP multicast or broadcast distribution embodiment, mutatis mutandis, for example in a network employing FLUTE In one arrangement, an HTTP Chunk Header (e.g., <size>\r\n, which is sometimes also called Chunk Boundary marker or chunk boundary indication) and trailer (trailing \r\n) may be removed from the received HTTP chunks. Service logic executing at the MC sender node 407 is operative to use the chunk payload for generating the NORM Transport Object, wherein the NORM Transport Object Size (i.e., equivalently, the HTTP chunk size) may be signaled either with the File Transfer Information extension header (EXT_FTI) or as part of a NORM INFO message (e.g., in one or more options as will be set forth below). It will be appreciated that in a mobile-network-based IP multicast distribution embodiment, on the other hand, it may be beneficial to always send full segment fragments as Objects. In such a scenario, the number of used HTTP chunks for a media fragment may be either signaled with a new HTTP header at the beginning of the segment, or may be separately configured with the CDN origin server node (either through a configuration file on the node or via an external configuration & control server) or a network element operative as an origin server for broadcast/multicast or its functional equivalent. Accordingly, skilled artisans will recognize that the case of NORM-based cable/DSL distribution environments, there may be no tangible benefit to aligning NORM Transport Objects with segment fragments.

When the CDN origin server 404 receives the HTTP headers and the segment URL for a new segment, the service logic associated with the MC sender 407 (e.g., configured to support NORM-based reliable multicast), is operative to provide the segment URL and the HTTP headers with a NORM INFO message associated with a particular Transport Object ID (TOI), e.g., NORM INFO 477 as illustrated in the message flow diagram 400B of FIG. 4B, to one or more edge multicast receiver nodes, e.g., MC receiver 409 associated with CDN edge node 406 (shown in FIG. 4A). It should be noted, that the CDN origin server 404 can make the received segment also available for unicast delivery. Conceptually, the CDN origin server 404 and the CDN EDGE 406 are then deployed on the same node and the ingest on HTTP Server Node 405 is immediately made available on the HTTP Server node 406.

In one example embodiment, the NORM INFO message may be associated with the first chunk of the segment through the TOI (i.e., the NORM INFO message carries the same TOI as the first chunk of the segment). It should be noted that whereas the HTTP header information in the NORM INFO message may be configured to indicate HTTP chunked delivery, thus it may not include an Content-Length header field in one example embodiment. Further, MC sender 407 may be configured to generate a NORM INFO message (e.g., with the HTTP headers and the segment URL) only for the first chunk (i.e., a full fragment or a partial fragment) of the segment according to one implementation, wherein subsequent chunks of the segment are not provided with a respective NORM INFO message. In this arrangement, the chunk size (also referred to as transport object size) may be signaled through the EXT_FTI extension header, as previously noted. The TOI value may be incremented sequentially for the subsequent fragments, e.g., increased iteratively by one, wherein a multicast client may be configured to associate the received object with the HTTP resource for which is has last received a NORM INFO message. By way of example, the first fragment with the segment URL and the HTTP headers may be sent in an object having a TOI value of 20. Preferably, the NORM MC receiver/client is operative to append all subsequent NORM Transport objects (e.g., Transport Object with TOI=21) to the transport object with TOI of 20, as illustrated in FIG. 4B, wherein multiple instances of reference numeral 478 refer to a plurality of NORM DATA messages or objects for carrying media data and associated with NORM INFO message 477. Skilled artisans will appreciate that a benefit of this distribution mechanism is that a NORM INFO message (e.g., NORM INFO message 477) can contain an exact copy of the HTTP header from the source node 402, while being devoid of a size indicator indicative of the size of the first HTTP chunk. As noted previously, last chunk signal 452 may be provided to the CDN origin node 404 after the data from the last fragment of a segment is uploaded in an HTTP chunk delivery transaction 451, which fragment data is processed and provided to the MC sender node 407 as internal data transmissions 446, 448.

In another exemplary embodiment, a NORM INFO message may be transmitted with every NORM transport Object, wherein the NORM INFO message for the first chunk may be configured to include the segment URL, HTTP headers as well as a size indication of the HTTP chunk size. On the other hand, the NORM INFO messages for all subsequent chunks may contain only the chunk size.

Set forth below is an example NORM INFO message for a first chunk according to one embodiment:
<SegmentMetadata>
<Metadata
key="segmentUrl"
value="http://ex.com/chn1/100.m4s">
<Metadata
key="httpHeaders"
value="HTTP/1.1 200 OK
Server: Apache
Accept-Ranges: bytes
Transfer-Encoding: chunked
Content-Type: video/mp4
Connection: keep-alive"/>
<Metadata
key="chunkSize"
value="1056">
</SegmentMetadata>

It should be noted, that the chunk size is not provided with the HTTP Headers, but as a separate entry.

An example NORM INFO message format for subsequent chunks may comprise as illustrated below:
<SegmentMetadata>
<Metadata
key="chunkSize"
value="1156"
</SegmentMetadata>

In another exemplary embodiment, a NORM INFO message may be transmitted with every NORM transport Object, wherein all NORM INFO messages may be configured to include the segment URL, HTTP headers as well as a size indication of the HTTP chunk size. To identify the first chunk, a chunk number is introduced into every NORM INFO message. The first chunk of a segment is always identified by chunk-number zero (or another well-defined number). All subsequent chunks are numbered with an increasing chunk number.

Set forth below is an example NORM INFO message for a first chunk according to one embodiment:
<SegmentMetadata>
<Metadata
key="segmentUrl"
value="http://ex.com/chn1/100.m4s"/>
<Metadata
key="httpHeaders"
value="HTTP/1.1 200 OK
Server: Apache
Accept-Ranges: bytes
Transfer-Encoding: chunked
Content-Type: video/mp4
Connection: keep-alive"/>
<Metadata
key="chunkSize"
value="1056"/>
<Metadata
key="chunkNumber"
value="0"/>
</SegmentMetadata>

An example format for subsequent chunks may comprise as illustrated below:
<SegmentMetadata>
<Metadata
key="segmentUrl"
value="http://ex.com/chn1/100.m4s"/>
<Metadata
key="httpHeaders"
value="HTTP/1.1 200 OK Server: Apache
Accept-Ranges: bytes
Transfer-Encoding: chunked
Content-Type: video/mp4
Connection: keep-alive"/>
<Metadata
key="chunkSize"
value="1156"/>
<Metadata
key="chunkNumber"
value="5"/>
</SegmentMetadata>

Whereas only the chunkSize indicator may be included in one embodiment as exemplified above, an additional or alternative variation may support providing segment URL as well, optionally or otherwise. One skilled in the art will recognize upon reference here to that a potential drawback of this scenario is that the HTTP header information and the segment URL information may have to be delayed until the first fragment is available.

Yet another variation involves using a chunk-offset instead of a chunk number to define the sequence of the chunks. For example, the chunk offset may be configured to represent the byte position at which a chunk is placed within the overarching segment. By way of illustration, a chunk offset zero indicates that the chunk is placed at the beginning of the overarching segment. A chunk offset 1000 may indicate that the first byte of the chunk is positioned at byte offset 1000 in the overarching segment. The sum of the chunk offset with the chunk size typically gives the chunk offset for the next chunk. The benefit of using a chunk offset compared to a chunk number is that the receiver can not only detect chunk losses, but can still detect the missing byte range of the missing chunk.

A still further variation may also involve transmission of a NORM INFO message for every NORM Transport Object, but two NORM INFO messages are transmitted for the first chunk. In this scenario, the first NORM INFO message for the first chunk may be configured to contain only the HTTP headers, while the second NORM INFO message may be configured to contain only the chunk size. An example NORM INFO message format containing the segment URL and the HTTP header information in this embodiment is set forth below:
    <SegmentMetadata>
    <Metadata
    key="segmentUrl"
    value=http://ex.com/chn1/100.m4s/>
    <Metadata
    key="httpHeaders"
    value="HTTP/1.1 200 OK
Server: Apache
Accept-Ranges: bytes
Transfer-Encoding: chunked
Content-Type: video/mp4
Connection: keep-alive"/>

An example NORM INFO message format for the first and all subsequent chunks (containing only the chunkSize, and optionally a segmentUrl) is set forth below:
    </SegmentMetadata>
    <Metadata
    key="chunkSize"
    value="1156"/>
    </SegmentMetadata>

Further details relative to the processing of a NORM edge receiver (e.g., MC receiver 409 associated with the CDN edge node 406 shown in FIG. 4A) are set forth immediately below.

In one example embodiment, as soon as the MC receiver component 409 associated with the CDN edge node 406 receives the NORM INFO message with the Segment URL and the HTTP Header information for the upcoming segment (e.g., NORM INFO message 477 in the message flow diagram 400B of FIG. 4B or via IP multicast information message 424 in the message flow diagram 400A of FIG. 4A), the CDN edge node 406 can start servicing a client request with respect to the requested media channel, although no HTTP payload and/or no Content-Length information has been received yet. Because the Content-Length information is not known, the CDN edge node 406 is operative to serve the response using the associated downstream HTTP CTE server 411 for effectuating HTTP chunked delivery, as the HTTP header "transfer-encoding: chunked" is still present in the payload of the NORM INFO message 477. In one arrangement, the chunked delivery of media payload may preferably take place until the full segment is received and cached. In another arrangement, regular HTTP responses may be provided, preferably after all fragments for the segment are received.

The HTTP CTE server component 411 of the CDN edge node 406 may be configured to commence serving by sending the HTTP Header information, which includes applicable content location information (e.g., including any URL translations, if necessary), as well as the Chunked-Transfer header, in respect of a CTE-compliant client. It should be appreciated that the first chunk can only be generated and transmitted when all the data for that chunk portion are received, particularly when the link bitrate between the client 408 and the CDN edge node 406 is higher than the multicast bitrate.

In an additional or alternative embodiment, the CDN edge node 406 may be configured to buffer the transport object for a configurable amount of time (e.g., relatively small) and/or until sufficient data for a chunk is received. By way of illustration, a 1400-byte buffering limit of may be provided (i.e., the HTTP server 411 buffers the data until 1400 bytes have been received), which could be the payload of a UDP packet.

Still further refinements regarding one or more of the foregoing embodiments are set forth in the following sections. As previously noted, the source node 402 may start sending the first fragment of the segment as soon as the segmenter 403 has finalized the fragment, e.g., all frames for the fragments have been received and encoded prior to creating the fragment. Furthermore, additional functionalities such as DRM/DWM, content policies, etc. may be introduced in the data plane at this juncture in a further embodiment. The MC sender component 407 associated with the CDN origin node 404 may be configured to receive the data excluding the HTTP chunked headers from the associated upstream HTTP CTE server component 405 and wrap the data into NORM packet payloads. A NORM Transport Object is partitioned into one or more NORM data packets. In one implementation, the MC sender component 407 may be configured to continuously increase a sequential packet identifier or payload identifier, which may be configured regardless of whether an error correction scheme, e.g., FEC scheme, is implemented for IP multicast distribution, and add it into each new packet of the IP transport objects. For example, an Encoding Symbol ID in the FEC Payload ID header may be incremented and added into each of new NORM or FCAST packets. The packet numbering may be a hierarchically organized, meaning a source block number and a packet or symbol number. Further, each packet may also contain the TOI field (Transport Object Id), as noted previously, which may be configured for uniquely associating each packet with the HTTP object or HTTP chunk. In one configuration, the MC receiver entity 409 may be configured to monitor the sequential payload/packet identifier (e.g., the FEC payload ID) of the received packets and order the packets according to the FEC Payload ID and forward the ordered stream to the associated downstream HTTP CTE server 411. When missing packets are detected (e.g., based on the FEC Payload ID), an embodiment of the MC receiver 409 may be configured to hold back the stream until the packet has been recovered. Skilled artisans will appreciate that this feature is particularly relevant in an embodiment of the present invention wherein In-Order delivery of the HTTP objects or HTTP chunks may be required for HTTP CTE.

With respect to indicating last chunk transmission in an HTTP CTE upload session, several variations may be practiced in accordance with the teachings herein. In one embodiment, when the segmenter 403 makes the last fragment of a segment available, the source network node 402 is operative to upload the fragment using HTTP chunked delivery and signal the end of the HTTP object using an Empty Chunk mechanism to indicate "end of HTTP Object", i.e., as a last chunk signal 452 set forth in FIGS. 4A and 4B). As noted previously, when the HTTP CTE server component 405 receives the "last chunk of object" signal, it is operative to calculate the object size by summing up all received chunk sizes. In one embodiment for implicitly signaling the "end of chunked delivery" using NORM, the MC receiver component 409 associated with the CDN edge node 406 may be configured to treat the reception of a new NORM INFO message having a new segment URL and new HTTP headers as an indication of the completion of the previous or current chunked delivery. Skilled artisans will recognize upon reference hereto that a potential drawback of such a solution is that the multicast client (e.g., MC receiver) cannot close a chunked object until a new object is started. In a further embodiment, a new NORM command (CMD) message may be generated for explicit signaling of the "end of chunked delivery" to the IP multicast recipient entities. A new NORM CMD message may be generated as a dedicated control message, which may be defined de novo, or an existing CMD message could be re-used or reconfigured for explicitly signaling an end-of-object indication to the MC receiver(s). In a still further embodiment, a NORM INFO message associated with a zero size NORM transport object may be generated to signal an end-of-object indication. One skilled in the art will recognize that this embodiment is only applicable to an arrangement where a NORM INFO message is transmitted with every chunk, which has been described as an example embodiment hereinabove. In a still further embodiment, the last NORM packet of the last chunk may be configured to contain a last chunk indicator, similar to a B Flag. In yet another variation, the MC sender component 407 may be configured to transmit an empty NORM Transport Object (still having a valid ESI and TOI) with the EXT_FTI extension header, wherein the extension header may be configured to contain the object size, to the MC receiver(s) of the distribution network.

FIG. 4C depicts a message flow diagram 400C relating to another ingestion variant embodiment which involves using HTTP GET for ingesting Media segments and chunks into the origin 404. In this variation, a segmenter/packager node 485, also referred to as segmenter origin, is configured to make segments available through a local HTTP server. The origin node 404 includes an ABR Client 487, which may be configured to fetch segments as described and triggered by an ABR manifest. By way of illustration, the ABR manifest may be a DASH Media Presentation Description (MPD) or another manifest format. The manifest describes segment URLs and the timing at which the Segments become available. The manifest URL and the association to a multicast sender function (407) is provided by a separate control node. The controller nodes provides the IP Multicast Address, UDP port and may be the protocol like FLUTE or NORM. For each newly received HTTP object or chunk, the MC sender assigns a unique transport object identifier. The ABR client 487 is operative to determine for each segment a Segment Availability Start time defining the time from which the segment is available for download using HTTP GET. When the segmenter/packager 485 creates multi-fragment segments, the segmenter/packager 485 is operative to make segment fragments earlier and use HTTP Chunked Transfer Encoding when an ABR client starts fetching the segment before the entire segment is available. The DASH Manifest may contain an indication (i.e. Availability Time Offset, ASTO) indicating that segment fragments are available a time offset before the full segment.

Responsive to being triggered by the segment availability start time (as calculated from a DASH manifest) and corrected by the ASTO time offset, the ABR client 487 is operative to send a segment request 489 containing the segment URL of the requested segment. The segmenter origin 485 starts sending a response 491 containing HTTP headers for the segment and the first HTTP chunk. Upon reception, the ABR client 487 triggers the MC Sender 407 passing on the segment URL (from segment request 489) and the HTTP headers from 491 using trigger 422, indicating HTTP Chunked Transfer Encoding. The ABR client 487 passes the HTTP response data on, removing the HTTP chunk boundary markers, to the MC Sender 407. The ABR client 487 continues forwarding HTTP chunks (e.g., chunks 437), removing HTTP Chunk boundary markers. When the ABR client 487 receives a last chunk indicator (e.g., indicator 451 as described above), it is operative to trigger a corresponding indication on the Multicast path (e.g., path 418). After that the ABR client 487 determines the start time of the next segment considering the time offset (ASTO) and triggers the segment fetching 493 of the next Segment Url. Then, the ABR client 487 triggers the MC sender 407 using the segment URL from fetching request 493 and the HTTP headers via path 495. It should be noted that the ABR Client 487 is only receiving fragment related media data during between 420 and 437 (and later between 444 and 451). While the segmenter 485 is creating the fragment, the segmenter is not sending any data related to fragments (i.e. no fragment data between 491 and 420 and between 437 and 444). When the segment contains more than two fragments or when the segmenter 485 is subdividing a fragment into more HTTP chunks, then the procedure is repeated accordingly.

Figure 6:
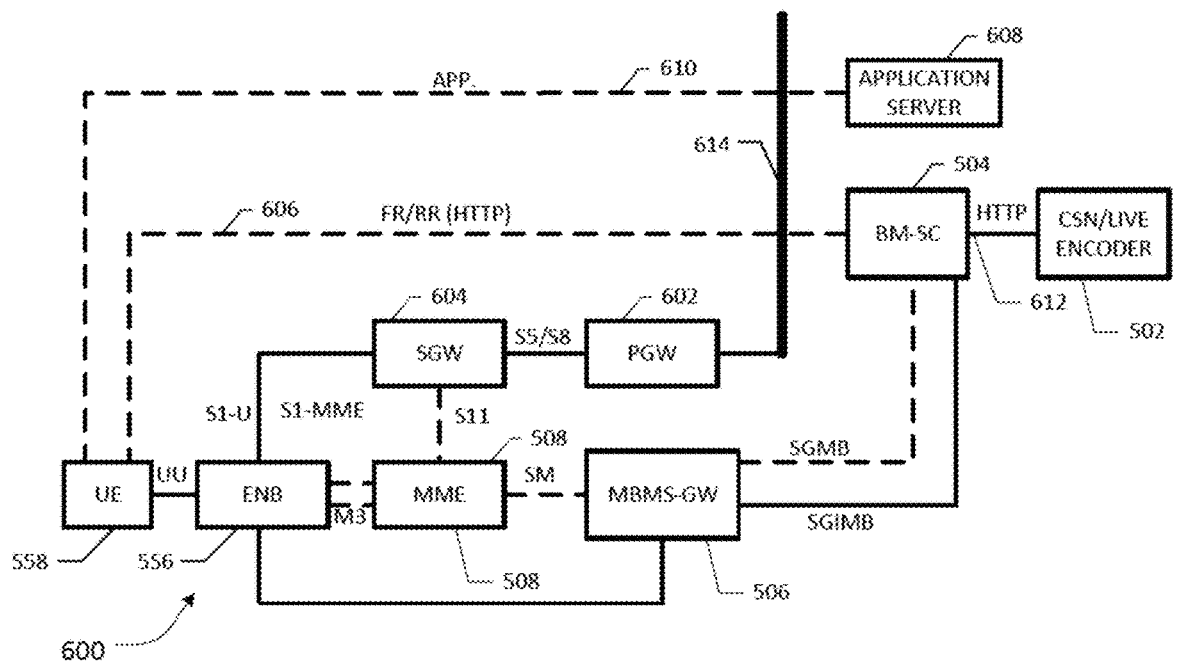
FIGS. 5-7 depict various aspects of a mobile telecommunications network architecture configured for media broadcast for purposes of an embodiment of the present invention.
Figure 5:
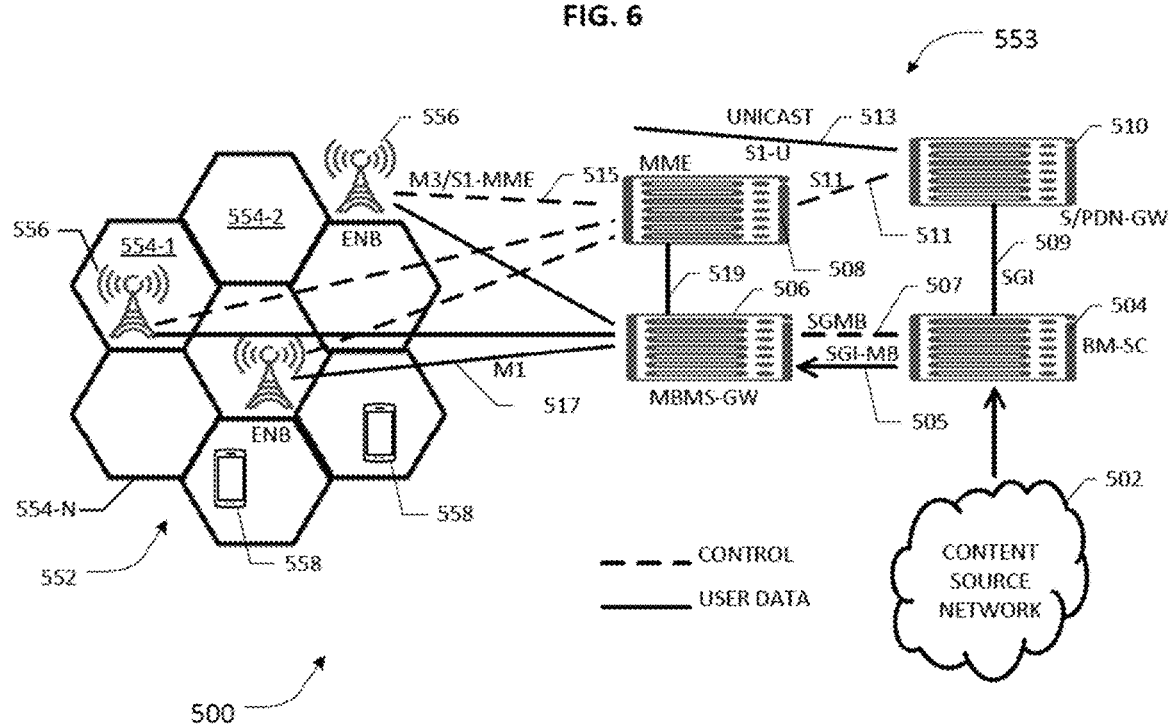
Figure 7:
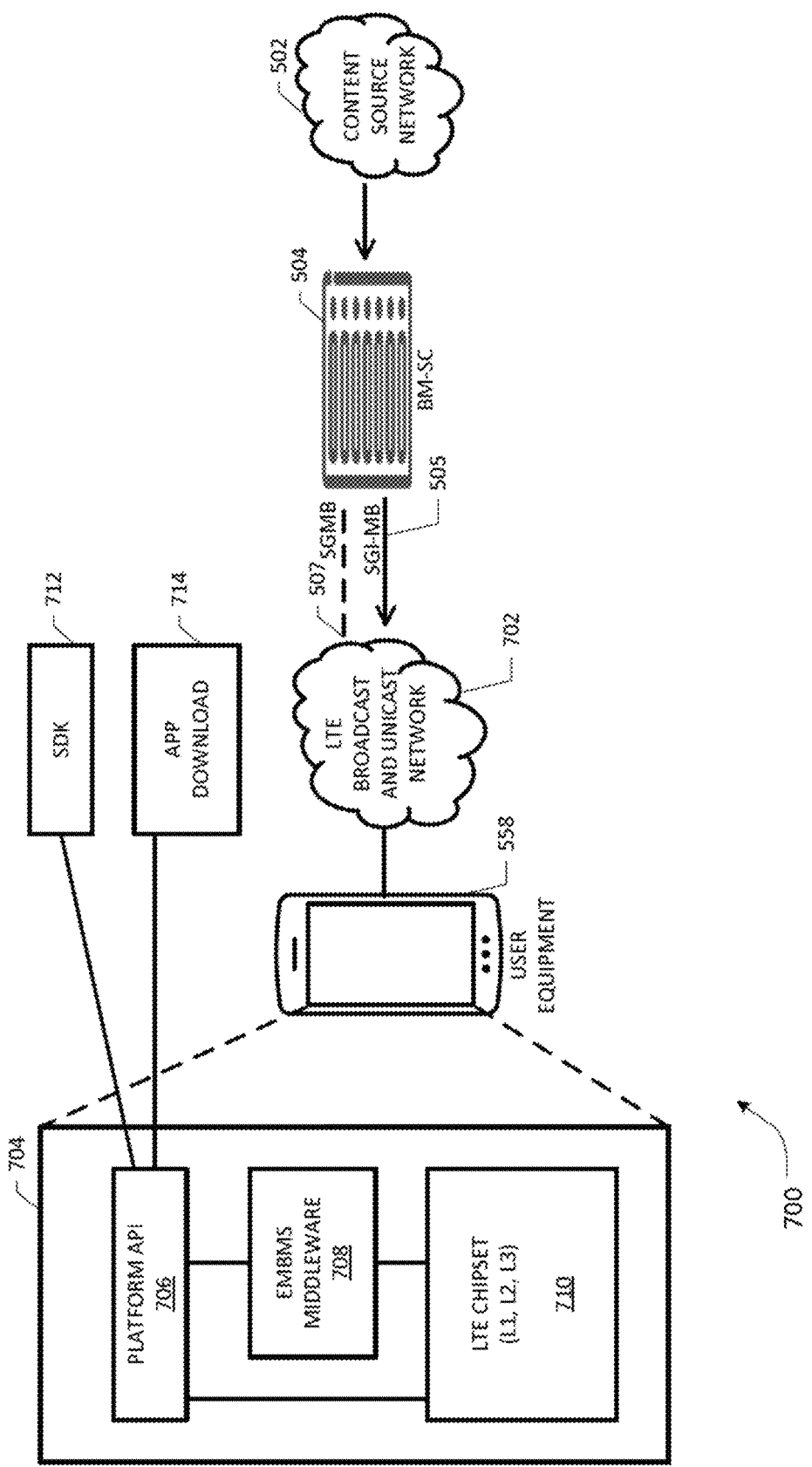

FIGS. 5-7 depict various aspects of an LTE mobile telecommunications network architecture configured for media broadcast for purposes of an embodiment of the present invention. Turning to FIG. 5 in particular, LTE network 500 is illustrated with a BMSC node 504 (e.g., operative as a mobile ingest gateway 231 shown in FIG. 2) that is disposed in an Evolved Packet Core (EPC) 553, which is configured to support Evolved Multimedia Broadcast Services (eMBMS) with respect to a broadcast service area 552 comprised of a plurality of cells 554-1 to 544-N in an example embodiment. By way of further illustration, one or more eNB nodes 556 are provided as part of the cellular infrastructure for servicing mobile users/devices 558 disposed in the service area 552. Preferably, a content source node or network 502 is operative to upload segment fragments to BMSC node 504 using HTTP chunked delivery as set forth in detail hereinabove. A serving gateway (SGW) and/or associated packet data network (PDN) gateway (PGW), shown as a common element 510 in FIG. 5, may be provided as part of EPC 553 and may be coupled to BMSC node 504 via SGi interface 509. A Mobility Management Entity (MME) 508 may be coupled to S/PGW element 510 via 511 control interface 511. An MBMS gateway (GW) node 506 may be coupled to MME 508 via Sm interface 519 and to BMSC 504 via SGmb control plane interface 507 and SGi-mb data plane interface 505. Each eNB node 556 may be coupled to MME 508 via a respective M3/S2-MME control plane interface 515 and to MBMS-GW 506 via a respective M1 data plane interface 517. S/PGW element 510 may also be provided with S1-U data plane interface 513 for supporting unicast.

In one example arrangement of the LTE network architecture 500, broadcast and unicast radio channels may be configured to coexist in the same cell and share the available capacity, wherein a subset of available radio resources may be temporarily assigned to a broadcast radio channel. Whereas a conventional LTE network is traditionally designed for unicast communication, with a separate radio channel serving each mobile device (wherein the resources allocated to the device depend on the data rate required by the service, the radio-channel quality and overall traffic volumes within the cell), broadcast/multicast communications may be implemented in an example embodiment as an extension to an Evolved Packet System (EPS) architecture comprising the EPC portion 553 coupled to the content source network 502 according to the teachings of the present patent application. One implementation of the LTE network architecture 500 may therefore be configured according to the 3GPP TS 23.246 (MBMS Architecture) specification, incorporated by reference herein, wherein media broadcast/multicast may coexist with unicast-data and voice services, although it should be appreciated that embodiments of the present invention are not limited thereto. In one arrangement, both live streaming and file-delivery use case scenarios may be supported, wherein different service combinations may be delivered simultaneously over the same bearer. In one arrangement, broadcast service activation may be configured to trigger the allocation of radio resources in the example LTE network 500 on as needed basis. For example, a broadcast session may be active for a short time, several minutes or for longer periods for instance, or several days in some cases. When the session is no longer active, the assigned radio and system resources may be reallocated for use by other services. Further, LTE broadcast may be activated for small geographical locations, such as stadiums and city centers, or for large areas, covering, e.g., an entire city or region. As long as there is sufficient capacity in the LTE network 500, multiple broadcast sessions can be active simultaneously. In one arrangement, resources for broadcast may therefore be allocated dynamically, e.g., up to 60 percent of the frequency division duplex (FDD) radio resources and/or up to 50 percent for time division duplex (TDD) may be assigned to a broadcast transmission.

In one example arrangement of the LTE network architecture 500, the radio interface may be based on orthogonal frequency-division multiplex (OFDM) in the downlink, where the frequency selective wideband channel may be subdivided into narrowband channels orthogonal to each other. For example, a 10-millisecond (ms) radio frame in time domain may consist of subframes of 1 ms each; where a subframe is the smallest unit with full frequency domain that can be allocated to a broadcast transmission. In an example eMBMS implementation, all users within a broadcast area, e.g., area 552, can receive broadcasted content, provided they have the right subscription level and an MBMS-capable device (i.e., a UE having an eMBMS client application). It will be apparent to skilled artisans that by setting up a single bearer over the radio interface, a network operator can distribute a data stream to an unlimited number of users. Although it is possible to deliver broadcast within a single cell of a service area (e.g., using point-to-multipoint (RIM) transmission), an embodiment of the present invention is may also be practiced using a single-frequency network (SFN) architecture. In one arrangement involving SFN, the broadcast area may comprise a plurality of eNB cells wherein broadcast data may be transmitted sent over a synchronized SFN that is effectuated as tightly synchronized, identical transmissions from multiple cells, using the same set of subframes and modulation and coding scheme. Skilled artisans will appreciate that in such an arrangement, the SFN transmissions are configured to appear to the device as a transmission from a single large cell over a time-dispersive channel, which can improve received signal quality and spectral efficiency. By using long data-symbol duration in OFDM, it is possible to mitigate the effect of inter-symbol interference (ISI) caused by delayed signals in an example mobile broadband delivery embodiment of the present invention based on SFN architecture. For additional protection against propagation delays, LTE/OFDM may be configured to use a guard interval, wherein delayed signals arriving during the guard interval do not cause ISI and so the data rate can be maintained. It should be appreciated that for SFN, unlike unicast, signals may arrive from many geographically separate sources and can incur large delay spread, which may cause unrecoverable packet losses, thereby necessitating further refinements in an IP multicast distribution scheme involving mobile broadband for purposes of the present invention. As one of the factors limiting MBMS capacity in the network is self-interference from signals from transmitters with a delay that is greater than the guard interval (i.e., low transmitter density), a long cyclic prefix may be added to MBSFN-reserved subframes in a further variation of the LTE network 500 so as to allow for the time difference in the receiver corresponds to an acceptable inter-site distance (ISD) (e.g., of approximately 5 km) that may be configured based on the capacity and broadband coverage area.

Continuing to refer to FIG. 5, BMSC node 504 may be configured as a key ingress point of an example LTE broadcast/multicast distribution tree supported by the LTE network architecture 500. Generic files and/or live video streams (e.g., in MPEG-DASH format) provided from CSN 502 via HTTP chunked delivery may be carried as content across the BMSC node 504 and made available for broadcast distribution using FLUTE as will be set forth in detail further below. In one embodiment, appropriate service logic executing at BMSC node 504 may be configured to add resilience to the broadcast by using a higher level error correction scheme, e.g., Application Layer FEC (AL-FEC), which not only adds redundancy to the stream so that receivers can recover packet losses but also supports various 3GPP-associated delivery procedures in certain additional or alternative arrangements. For example, such procedures may include unicast base file repair—allowing receivers to fetch the remaining parts of a file through unicast from BMSC node 504. Additional procedures may be implemented for reception reporting whereby a network operator or a network management entity can collect QoE reports and determine session-quality measurements as may be needed.

In an example implementation of the LTE network architecture 500, appropriate service logic executing at MBMS-GW 506 may be configured to provide a gateway functionality between the radio and service network portions. In one arrangement, MBMS-GW 506 forwards streams from the BMSC node 504 to all eNBs participating in the SFN transmission or PTM transmission. IP multicast is used on the M1 interface between the gateway and the eNBs, so that the packet replication function of existing routers can be used efficiently. The gateway node 506 may be further configured to route MBMS session control signaling to one or more MMEs 508 serving the area 552. The MMEs 508 in turn replicate, filter and forward session control messages to the eNBs 556 participating in the specific broadcast session. In one arrangement, the eNBs 556 may be operative to provide functionality for configuration of SFN areas, as well as broadcasting MBMS user data and MBMS-related control signaling on the radio interface to all devices. Skilled artisans will recognize that in such an arrangement, an eNB node may be provided with the 3GPP Multicell Coordination Entity (MOE) function.

FIG. 6 depicts an example eMBMS architecture 600 illustrating various interfaces that may be realized in the LTE network 500 of FIG. 5 for purposes of an embodiment of the present invention. As several of the nodes or elements depicted in FIG. 6 are identical to the nodes or elements of FIG. 5 set forth above in detail, their detailed description will not be repeated herein. An HTTP CTE interface or network path 612 is provided between CSN/live encoder node 502 (which contains a segmenter/packager as 402/403 in FIG. 4A or node 302 in FIG. 3) and BMSC 504 for effectuating low latency media upload operations as described previously. SGW 604 and PGW 602 are separately shown in this exemplary architecture, wherein SGW 604 is operative to route and forward user data packets, while also acting as a mobility anchor for the user plane during inter-eNB handovers as well as the anchor for mobility between LTE and other 3GPP technologies (where provided). For idle state UEs, SGW 604 terminates the downlink data path and triggers paging when downlink data arrives for the UE. Appropriate service logic executing at SGW 604 is further operative to manage and store UE context, e.g. parameters of the IP bearer service, network internal routing information, etc. PGW 602 is operative to provide connectivity from a UE device (e.g., UE 558) to external packet data networks (PDNs) by being the point of exit and entry of traffic for the UE. A UE may have simultaneous connectivity with more than one PGW for accessing one or more PDNs (e.g., PDN 614). Appropriate service logic executing at PGW 602 is further operative to perform policy enforcement, packet filtering for each user, charging support, lawful interception, and packet screening, etc. Depending on deployment, PGW 602 may be further configured is to act as the anchor for mobility between 3GPP and non-3GPP technologies such as WiMAX and 3GPP2 networks (e.g., CDMA 1X and EvDO). Whereas additional network nodes such as, e.g., home subscriber server (HSS), access network discovery and selection function (ANDSF), evolved packet data gateway (ePDG), etc. are not shown in the eMBMS architecture 600 of FIG. 6, it should be appreciated that such nodes or elements may also be included in an example network arrangement depending on a particular operator's infrastructure deployment.

In one embodiment, UE 558 may be configured as an eMBMS-enabled end station, which may further include IP multicast receiver functionality and/or HTTP CTE receiver functionality for purposes of an embodiment of the present invention. An HTTP interface 606 may also be disposed between UE 558 and BMSC 604. Depending on the applications executing on UE 558, an application interface 610 may be disposed between UE 558 and one or more application servers 608. An example UE device platform 704 is illustrated in FIG. 7 with respect to a mobile broadband network environment 700. An LTE broadcast/unicast network 702 is representative of at least a portion of the network architectures 500, 600 described hereinabove, which is disposed between BMSC 504 and UE 558. In one arrangement, UE device platform 704 may comprise a lower level module 710 incorporating LTE radio layers, which may be implemented in a chipset for supporting unicast as well as broadcast. A middleware block or module 708 is operative to handle a suitable IP multicast protocol (e.g., FLUTE in a particular embodiment described in additional detail further below), AL-FEC decoding, unicast file repair, transport control functions (including service scheduling), as well as a cache for post-broadcast file/fragment processing. Depending on implementation, a higher level block or module 706 may be provided to facilitate one or more platform application programming interfaces (APIs) with respect to the middleware 708 and connectivity layer methods, whereby suitable software development kits (SDKs) and application download entities 712 may be interfaced for developing, testing and creating eMBMS-enabled applications. Accordingly, an example UE device may comprise not only smartphones and tablets but also various embedded platforms configured for M2M communications.

As pointed out previously, and further described in detail below, a live video/file delivery scenario in an example eMBMS-capable LTE network utilizes FLUTE for IP multicasting from a serving node such as BMSC node 504. Live streaming within an eMBMS architecture may be provided in order to support services for real-time video and audio broadcasting, whereas on-request file delivery enables services such as unicast off-load (e.g., local device caching), software updates and M2M file loading. It should be appreciated that, in fact, any arbitrary file or sequence of files can be distributed over an eMBMS architecture, which files or fragments may be uploaded to a head node of the broadcast distribution tree, e.g., BMSC 504, using low latency HTTP CTE delivery or other mechanisms. In some implementations, a target broadcast area for exemplary use cases may be any desired size—some scenarios may require a small broadcast area, such as a venue or a shopping mall, and other cases require much larger areas, even up to nationwide coverage. Where HTTP Adaptive Streaming (HAS) (e.g., HLS, MPEG-DASH, HDS, HSS, CMAF, etc.) is utilized in a live video application, an example eMBMS architecture may be advantageously configured to interoperate with the same live encoder and common clients for unicast and broadcast offerings. The IETF FLUTE protocol (as set forth in RFC 3926, incorporated by reference herein) may be employed in an example embodiment that allows distribution of files over multiple unidirectional links using UDP. In one arrangement involving FLUTE, a nested/hierarchical delivery architecture for eMBMS sessions may be used, where the duration of a delivery session may span one or more eMBMS sessions. In one arrangement, the broadcast may be active for the entire eMBMS session, during which UEs can receive content.

In general, the following phases of an eMBMS multicast service provisioning may be implemented: (i) subscription, (ii) service announcement, (iii) joining, (iv) session start, (v) MBMS notification, (vi) data transfer, (vii) session termination, and (viii) leaving. The phases of subscription, joining, and leaving may be performed individually per user. The rest of the phases may be performed on service by service basis, i.e., for all users interested in a particular service. The sequence of phases may repeat, e.g., depending on the need to transfer the data. Further, subscription, joining, leaving, service announcement as well as MBMS notification may run in parallel to other phases. In a broadcast service mode, the following phases may be provided: (i) service announcement, (ii) session start, (iii) MBMS notification, (iv) data transfer, and (v) session termination. As in multicast mode, the sequence of phases in broadcast mode may also repeat, e.g., depending on the need to transfer the data. It is also possible that the service announcement and MBMS notification phase may run in parallel with other phases, e.g., in order to inform UEs that have not yet received the particular media broadcast service.

Figure 8:
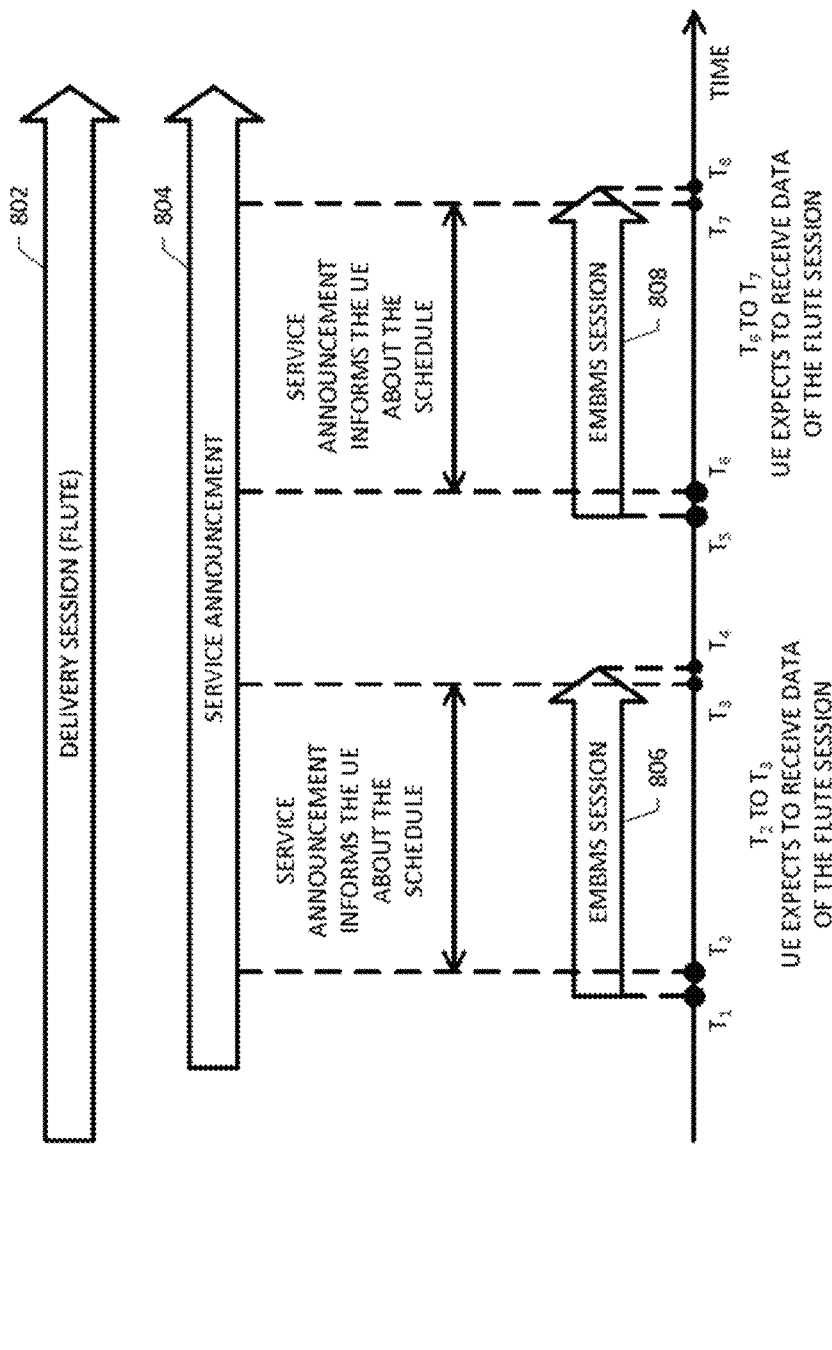
FIG. 8 depicts a session scheduling sequence in an example mobile telecommunications network for purposes of an embodiment of the present invention.

The relationship between delivery sessions and eMBMS sessions in an example session scheduling scenario 800 is shown in FIG. 8, wherein a FLUTE delivery session 802 spans multiple eMBMS sessions 806, 808. Service announcement 804 may be used to inform devices about delivery sessions 802 as well as eMBMS sessions 806, 808, e.g., by using a schedule description, whereby the UE devices do not need to monitor the radio interface for eMBMS sessions continuously. In the illustrated scenario 800 of FIG. 8, the schedule description instructs the UE to expect an eMBMS session between certain time ranges or windows, e.g., between $T_2$ and $T_3$ and between $T_6$ and $T_7$, relative to respective reference times $T_1$ and $T_5$. Before the UE expects an eMBMS session 806, it is preferably configured to be already active on the radio interface (i.e., $T_1 < T_2$). When it comes to file-delivery services, it is preferred that devices should search for sessions prior to expected transmission time on the radio, to ensure that they do not miss the start of a transmission. It should be appreciated that the example scenario 800 in FIG. 8 could represent a service, such as downloading an application that allows users to activate, receive and interact with the broadcast using unicast services from a phone, tablet or television. From the point of view of the user and the UE middleware, the two broadcasts 806, 808 belong to the same MBMS user service, which presents a complete offering including activation and deactivation.

To facilitate the description of embodiments involving chunked FLUTE delivery for LTE broadcast, a brief section on FLUTE is set forth immediately below.

In FLUTE, a File Delivery Table (FDT) is provided as a means to describe various attributes associated with files that are to be delivered within a file delivery session. As a database mechanism, FDT may contain a mapping between Transport Object Identifiers (TOI) (similar to the identification of NORM transport objects described previously) and file metadata such as the file name, content location (e.g., URL/URI), file Type, file size, FEC Instance ID, etc. The TOI is an integer value, stamped in each UDP packet, which belongs to the file. A receiver/client may be configured to determine IP/UDP packets' association with any given file based on TOI value. From the file size, which is typically provided with the FLUTE FDT instances to the client, the client can derive the number of expected UDP packets for the file with a specific TOI value. A sequence number (e.g., represented as Encoding Symbol ID and Source Block Number) allows the client to reassemble the file correctly from a sequence of IP/UDP packet payloads. The sequence numbering of the packets may also be used for packet loss detection.

In one arrangement, a FLUTE-based network may be configured to support independent transmission of the FDT Instances and the actual FLUTE transport objects (as identified by the TOI). The FDT Instances may be configured to provide one or more file entries (which also contain the TOI association for that file) to the receiver. FLUTE does not require that the sender send the actual FLUTE transport objects in combination with the FDT Instances. In an example LTE MBMS implementation, an implicit assumption for file entries may be that an FDT Instance with the file entry is received before any data of the actual transport object is received. Thus, it is assumed that the client already has the file metadata (such as file name and file size) before the first packet with the TOI is received. In a further example implementation, the FDT Instance information for a file may be combined with the actual transmission object, wherein it may be the case that has the needed metadata such as file name, file size and content type for each transport object, similar to the IETF FCAST protocol (RFC 6968), incorporated by reference herein. In a further arrangement (e.g., compliant with the MBMS API specification set forth in 3GPP TS 26.347, incorporated by reference herein), any file received via FLUTE on an MBMS bearer may be offered via HTTP to client applications for retrieval. According to one embodiment, therefore, an MBMS receiver/client may be configured to receive a complete file (e.g., a DASH media segment) and make the file available on a local HTTP server. The actual file URLs (which may include the file names from the FLUTE delivery) may be either notified through the API or described in a separate metadata file such as a DASH Media Presentation Description (MPD) file.

To support low-latency chunked delivery in a FLUTE-based LTE eMBMS environment, embodiments herein provide appropriate extensions and modifications to FLUTE FDT Instances so as to facilitate transmission of FLUTE Transport Objects as partial files (e.g., for HTTP Chunks of a single file, fragment or segment). In one implementation, an FDT Instance extension may include sequential identification of FLUTE Transport Objects that accounts for signaling of a "last Chunk indicator". Further, a FLUTE-based entity according to an embodiment of the present invention may be configured to transmit the partial file as soon as it is received and not wait to assemble all partial files (e.g., there is no requirement that only complete files be transmitted). In a still further arrangement, as the media ingestion becomes fragment-based, a BMSC entity (operative as a FLUTE sender) may be configured to parse the incoming HTTP chunked stream in order to find fragment boundaries. In another embodiment, the content source entity (e.g., a segmenter/packager node) may be configured to commit to always put a fragment into the same fixed number of HTTP chunks (e.g., the segmenter commits to sending every fragment with two HTTP chunks). With respect to the treatment of losses in transport objects and/or chunks, an example embodiment may involve application of FEC or File Repair to a partial file. Where the partial file cannot be repaired, an example embodiment may be configured to ensure that subsequent partial files are receivable, wherein a FLUTE transport object may be configured as a sequence of one or more UDP packets, all associated with the same object by way of a TOI mapping relationship.

As previously noted, an embodiment of the segmentation and segment-fragmentation process of the present invention involves generating relatively short fragments built from frames (e.g., a GOP subdivided into two or more fragments) for facilitating low latency media ingestion. With respect to signaling low latency fragments in a DASH environment, one option may be based on the usage of the Availability Time Offset (ASTO) information from the DASH MPD. In another arrangement, a parameter called SegmentTimeline may be used to signal the segment availability for each individual fragment. In an example scenario, consider each segment containing 1-second worth of media data. Assuming that the content is encoded at 30 frames per second (fps) and the segmenter/packager is configured to pack 5 frames into a fragment, each segment contains 30/5=6 fragments where each fragment contains 5 frames=166.67 ms worth of media data (given by 5 frames/30 fps). The segmenter appends fragments to the segment until all fragments (in this case 6) of the segment are received. Thus, to build a 1-second segment the segmenter appends 5 more fragments after the initial fragment was written. On the client side, the DASH player may be configured to start playing the "first" fragment (as opposed to waiting until all 6 arrive) by utilizing the @availabilityTimeOffset (ASTO) parameter signaled in the DASH MPD. This informs the client how much earlier the client may begin "fetching" compared to its computed availability start time for all Segments of all associated Representation. In this example scenario, the ASTO parameter may be set to equal 833.4 ms, which indicates to the player that the first part of the segment (i.e., the first fragment) becomes available 833.34 ms before the last part of the segment (from the perspective of the player). Accordingly, the client may be configured to issue an HTTP GET request for the segment 833.34 ms before the segment availability start time (as calculated from the MPD). Further, the segmenter/packager may be configured to push all subsequent fragments to the client using HTTP chunked delivery, once the first fragment was requested using HTTP GET. In this arrangement, the client therefore issues an HTTP GET request every second and the segmenter pushes the data when available (e.g., in a hybrid push-pull distribution/delivery scenario, which may be asynchronous). As such, the segmenter/packager does not know the segment size before the last fragment of the segment is created, and therefore cannot signal the content-size in the HTTP header at the beginning.

In another arrangement, the segmenter/packager may be configured such that each segment to contain only a single fragment, wherein the segmenter/packager notifies the client segment availability of each individual segment/fragment. Since each segment contains only one fragment, the server knows the segment size, once the fragment is available. Assuming a similar segmentation configuration as set forth above (i.e., the content is encoded at 30 fps and the segmenter puts 5 frames into each fragment), the segmenter creates a new segment with 166.67 ms. Because the client must issue an HTTP GET request every 166.67 ms, six such requests are needed to obtain 1-second worth of media data, instead of one HTTP GET request in the previous arrangement. Accordingly, it should be appreciated that although a FLUTE-or NORM based distribution network involving this sub-segmentation arrangement may be implemented in one embodiment, it would require a high number of HTTP GET transactions for delivery of content, thereby potentially impacting the network performance.

In a presently preferred example embodiment of the present invention, therefore, the amount of HTTP level overhead (e.g., URLs and HTTP headers) can be reduced significantly, since the receiver/client device is configured to receive a sequence of fragments linearly through the HTTP pipe with fewer number of GET transactions, even for relatively large segment sizes. As noted above, embodiments herein involve extending/modifying the IP multicast protocol (e.g., FLUTE, FCAST, etc.) to support HTTP chunked delivery so that each HTTP chunk can be packed as an individual Transport Object in FLUTE/FCAST. In one arrangement, the FLUTE/FCAST functionality may be co-located with the segmenter such that a new transport object is generated with every new fragment based on internal data transfer mechanisms and communications. In another arrangement, the segmenter may be configured to use HTTP CTE sessions on the ingest side for uploading to a BMSC node, which may be configured according to the teachings of the present invention for parsing and handling the received chunks to determine fragment boundaries.

Broadly, in one arrangement, FLUTE FDT Instances are extended with HTTP chunk related information in order to take advantage of multiple fragments provided for each media segment. Accordingly, an example FLUTE FDT Instance schema is configured to include a chunk identifier parameter such that an FDT Instance and/or the FDT can contain multiple file entries with the same file URL, but different chunk numbers or chunk offsets. In one particular implementation, the FDT Instance may be extended with HTTP-Chunk-Start elements (also called chunk-offset element as noted earlier) and a chunk-size elements for each transport object containing an HTTP chunk. Alternatively, the content-length element may contain the chunk-size information when the HTTP Chunk Start element is present for an FLUTE Transport object. The HTTP Chunk Start contains the byte offset of the first byte of the chunk relative to start of the overarching file (e.g., relative to the first chunk of the file). By way of illustration, when the first chunk is of 1024 bytes, the HTTP-Chunk-Start value for the second chunk may be configured to be 1024. When the second chunk is of 100 bytes size, the byte offset of the third chunk is 1124, and so on. Skilled artisans will appreciate that in such an arrangement the HTTP-Chunk-Start value can also be configured to secure the sequence of HTTP chunks, whereby the client can derive from the HTTP-Chunk-Start the precise position of the HTTP chunk in the actual file. Similar to the HTTP CTE delivery, an empty chunk indicates the last chunk of the HTTP body. In case of FLUTE, the FLUTE sender only sends the FDT instance, indicating the file URL and the HTTP-Chunk-start, but the chunk-size is set to zero. Accordingly, in this arrangement, the FLUTE sender does not generate any transport object packets with respect to the last chunk signaling within the IP multicast distribution tree. In another embodiment, the FLUTE sender sends a FLUTE transport object of size zero (i.e., just a FLUTE packet with no payload), when the FDT instance indicates a chunk-size of zero (i.e. last chunk indicator).

In a practical FLUTE-based network deployment, it may be assumed that individual FLUTE transport objects can get corrupted wherein the redundancy data for correction (e.g., FEC) may be incapable of recovering the HTTP chunk. As noted previously, an example LTE MBMS system (e.g., the embodiments set forth in FIGS. 5-7) may rely on AL-FEC mechanisms to increase the transmission reliability. Accordingly, when sending HTTP chunks in an example embodiment of the present invention, an HTTP chunk may be configured as an FEC source block.

In one arrangement, a BMSC node operative as a FLUTE sender may be configured to always put a full fragment into a transport object. In order to effectuate such packing, appropriate service logic executing at the BMSC node may be configured to either parse the incoming HTTP chunk stream for fragment boundaries or the segmenter is configured to subdivide the fragment into a fixed number of HTTP chunks (e.g., two chunks per fragment, as noted above). Accordingly, multiple HTTP chunks may be combined/packed into a single, new FLUTE chunked transport object for multicast distribution. As HTTP chunked delivery requires a reliable transport and in-sequence delivery of HTTP chunks, when a chunk from the front or in the middle of the chunk stream is lost or corrupted, the receiver may be configured to compensate for the loss so that the chunk delivery sequence is still maintained. In order to support an ISOBMFF parser, an embodiment of the FLUTE receiver of the present may be configured to create suitable ISOBMFF boxes, e.g., 'free' or 'skip' ISOBMFF boxes, in the stream towards the client. In some cases, the FLUTE client may be configured to generate full movie fragment headers, e.g., to signal the duration of the missing fragment. In order to support this feature, an embodiment of the FLUTE FDT instance may be configured to contain a presentation time parameter (e.g., Presentation Timestamp or PTS) associated with the fragment in the presentation, whereby the receiver is operative to introduce a NULL fragment with correct presentation duration into the stream. It will be apparent to a skilled artisan upon reference hereto that in an example embodiment herein the receiver is advantageously enabled to derive the chunk size and optionally some fragment information from subsequent chunks.

Figure 9:
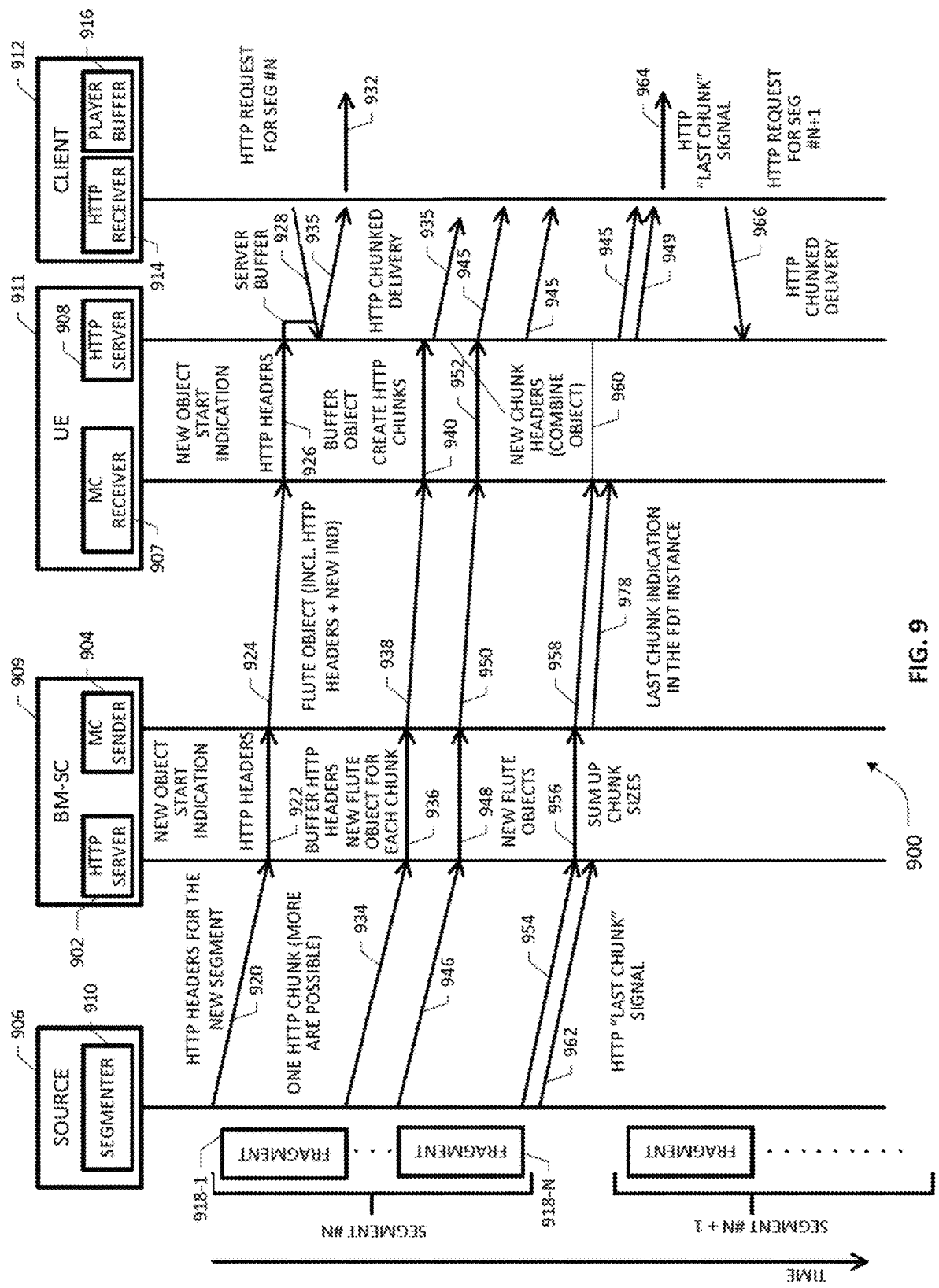
FIG. 9 depicts a message flow diagram depicting media ingestion and distribution in a mobile-broadcast-based implementation according to an example embodiment.

Turning to FIG. 9, depicted therein is a message flow diagram 900 depicting media ingestion and distribution in a mobile-broadcast-based implementation according to an example embodiment. It should be appreciated that the message flow diagram 900 is somewhat similar to the message flow diagram 400A of FIG. 4A (relating to a CDN-based IP multicast distribution). Accordingly, relevant portions of the description of FIG. 4A may be applied with respect to FIG. 9 as well, mutatis mutandis, wherein an example LTE broadcast implementation involving FLUTE-based multicast distribution is provided. An example source network 906 includes a segmenter/packager 910 operative to effectuate an HTTP CTE session with a BMSC node 909 that may include an HTTP CTE server component 902 and a FLUTE MC sender component 904, which may be architected as a distributed computing platform in one embodiment. A mobile UE node 911 is operative as a multicast endpoint that may include an MC receiver component 907 and an HTTP CTE server component 908. A client application 912 capable of HTTP chunked delivery may be provided with an HTTP CTE receiver 914 and a media player/buffer 916. Although a single mobile UE node 911 is exemplified in FIG. 9, skilled artisans will understand that a plurality of UE nodes taking part in a subscription-based multicast service may be disposed in an LTE broadcast area as described above in reference to an example LTE architecture shown in to FIGS. 5-7. Further, additional intermediary nodes or elements such as MBMS gateways, eNB nodes, etc. are not specifically shown in the message flow diagram 900 of FIG. 9.

When the source/segmenter 906/910 starts a new segment (e.g., Segment #N), it may be configured to send in an initial message 920 containing associated HTTP headers such as, e.g., MIME Type, content location information (e.g., segment URL), etc. to the HTTP CTE server component 902 of BMSC 909. One skilled in the art will recognize that HTTP Pull can also be used for ingestion. As before, the HTTP headers also include an indication of HTTP chunked transfer encoding for segment upload/ingestion. After the source/segmenter 906/910 has indicated the creation of a new segment and has provided the HTTP headers and the segment URL, the source/segmenter 906/910 is configured to collect all data for a fragment 918-1. Once the source/segmenter 906/910 has created fragment 918-1, it is operative to send the data of the fragment 918-1 using one or more HTTP chunks. Similar to the embodiment of FIG. 4A, reference numeral 934 refers to one or more chunk transmissions used for uploading the media data of the fragment 918-1. Likewise, reference numerals 946, 954 refer to a plurality of chunk transmissions used for uploading the media data of the last fragment 918-N of Segment #1. In an example implementation of LTE broadcast, the BMSC node 909 is operative to pack each fragment into one Transport Object (i.e., the fragment is not "split" across multiple IP multicast objects). Where the source/segmenter 906/910 provides the fragment using multiple HTTP chunks, the BMSC node 909 is therefore operative in one embodiment to receive all the chunks for a fragment and pack it in a Transport Object having a TOI. In order to avoid parsing the byte stream, the BMSC node 909 may be signaled as to how many HTTP chunks the source/segmenter 906/910 creates for a single fragment. Either a new HTTP header is created, which is added to a segment's HTTP headers, or the BMSC node 909 receives the information through control configuration, e.g., using a number of techniques previously set forth. It should be appreciated that the feature of packing all chunks of a fragment (i.e., a full fragment) into a multicast transport object is not necessarily limited to FLUTE embodiments, as it can also be implemented in other IP multicast environments (e.g., NORM-based multicast distribution networks).

Continuing to refer to FIG. 9, reference numerals 922, 934 refer to the propagation of HTTP headers (e.g., pursuant to a new object indication) across the multicast/broadcast network to UE 911. Likewise, reference numerals 936, 948, 956 refer to the internal propagation of the chunks between HTTP server 902 and FLUTE MC sender 904, which are packed into FLUTE Transport objects for transmissions 938, 950, 958, respectively, to the MC receiver component 907 of UE 911. Similar to the processing at an CDN edge node in a NORM-based environment as shown in FIG. 4A, reference numerals 926, 940, 952, 960 refer to the processing of HTTP headers, buffering/transmission of chunked data at UE 911. HTTP download operations between the client application 912 and the HTTP CTE server component 908 of UE 911 are similarly illustrated as HTTP request 928 for a segment (e.g., Segment #N), followed by CTE chunked delivery transmissions 935 relative to the fragment 918-1 and chunked delivery transmissions 945 relative to the final fragment 918-N. As indicated by reference numerals 932, the received media data may be provided to the media player's buffer 916 for rendering at a suitable display.

A last chunk signal 962 may be provided to BMSC node 909 to signal segment boundary demarcation. As before, BMSC node 909 is operative to sum up all chunk sizes and/or provide a last chunk indication 978 in an FDT Instance to UE 911. In response, UE 911 may provide a corresponding indication 949 to the client, which may be propagated to the media player as indicated by signal 964. Depending on the UE/client configuration, an HTTP request 966 for a next segment (e.g., Segment #N+1) may be based upon the receipt of the propagated last chunk signal 964. In another example embodiment, the client may be configured to generate next segment requests 966 at preconfigured intervals without explicitly requiring a last chunk signal 964, similar to the NORM-based messaging flow shown in FIG. 4A.

It should be appreciated that the various client-side components shown in FIG. 9, e.g., MC receiver 907, HTTP server 908, HTTP receiver 914 and player/buffer 916 may be integrated in different arrangements, as alluded to hereinabove with respect to an example eMBMS-capable device platform 704 in FIG. 7. For example, where the player is configured to consume the IP multicast directly, the IP MC receiver functionality may be integrated within the player functionality. In this case, the player functionality continues to "HTTP like" file operations, but via direct API calls and not HTTP calls. Further, an eMBMS client may include or be co-located with the IP multicast receiver, wherein an application may directly include the eMBMS client, thereby avoid using HTTP to fetch files. Accordingly, it should be appreciated that it is not necessary to have HTTP CTE download operations at the client-side in an example embodiment. In another arrangement, for example, direct file access API may be used instead in conjunction with the FLUTE multicast for purposes of the present invention.

As noted above, an example FLUTE-based LTE broadcast distribution scheme involves associating FLUTE Transport Objects to HTTP metadata and segment location information (e.g., URL/URI pointers) through FDT Instances. An example schema for an FDT Instance configured for HTTP chunking is set forth below wherein entries for a first fragment of a segment are illustrated (note that the element Chunk-Size is called Chunk-Length here and the HTTP-Chunk-Start is called Chunk-Offset here).

<?xml version="1.0" encoding="UTF-8"?>
<FDT-Instance
xmlns="urn:IETF:metadata:2005:FLUTE:FDT"
xmlns:xsi="http://www.w3.org/2001/XMLSchema-instance"
FEC-OTI-FEC-Encoding-ID="1"
Expires="331129600">
<File
Content-Type="video/mp4"
Content-Location="http://ex.com/chn1/100.m4s"
Chunk-Length="1024"
Chunk-Offset="0"
TOI="2"
FEC-OTI-Encoding-Symbol-Length="16"
FEC-OTI-Scheme-Specific-Info="AAEBBA=="
</File>

The foregoing example illustrates the association of the Transport Object having Object ID 2 to an HTTP URL. Further, a Chunk-Length parameter is configured to indicate that chunked delivery is used as well as the chunk size (e.g., which may specify or represent the size of a transport object in bytes).

An example schema for the FDT Instance of a subsequent fragment (and transport object) may be illustrated as below. It should be noted that the Content-Location parameter value is the same URL as in all other fragments, belonging to this object, wherein the combination of the Content-Location parameter with the Chunk-Offset parameter gives a unique reference for a particular fragment:

<?xml version="1.0" encoding="UTF-8"?>
<FDT-Instance
xmlns="urn:IETF:metadata:2005:FLUTE:FDT"
xmlns:xsi="http://www.w3.org/2001/XMLSchema-instance"
FEC-OTI-FEC-Encoding-ID="1"
Expires="331229600">
<File
Content-Type="video/mp4"
Content-Location="http://ex.com/chn1/100.m4s"
Chunk-Length="1024"
Chunk-Offset="2048"
TOI="4"
FEC-OTI-Encoding-Symbol-Length="16"
FEC-OTI-Scheme-Specific-Info="AAEBBA=="
</File>

The above example FDT Instance is illustrative of the third fragment in the sequence, wherein the first fragment starts with Chunk-Offset 0, the second fragment with Chunk-Offset 1024 and the third with Chunk-Offset 2048. In one example embodiment, when the preceding Transport Object is lost (e.g., because packet losses being too high), the received transport object can be clearly placed in the overarching segment based on its relative position.

Based on the foregoing, it should be appreciated that various entities such as segments, fragments, HTTP Chunks and Transport Objects (FLUTE or NORM) may be provided in a layered architecture in the practice of an example embodiment of the present invention. For instance, a segment may comprise multiple fragments, wherein each fragment may be carried by one or more HTTP Chunks, each Chunk carried by one Transport Object. A plurality of UDP packets may form a NORM or FLUTE Transport Object. In the case of NORM INFO, the following pieces of information may be provided: TOI in NORM INFOR packet header, URL, Chunked indicator, Chunk Size, and Chunk Offset or Number. Likewise, in the case of FLUTE FDT Instance, the following pieces of information may be provided: TOI, URL, Chunked indicator, Chunk Size, and Chunk Offset or Number.

Figure 10A:
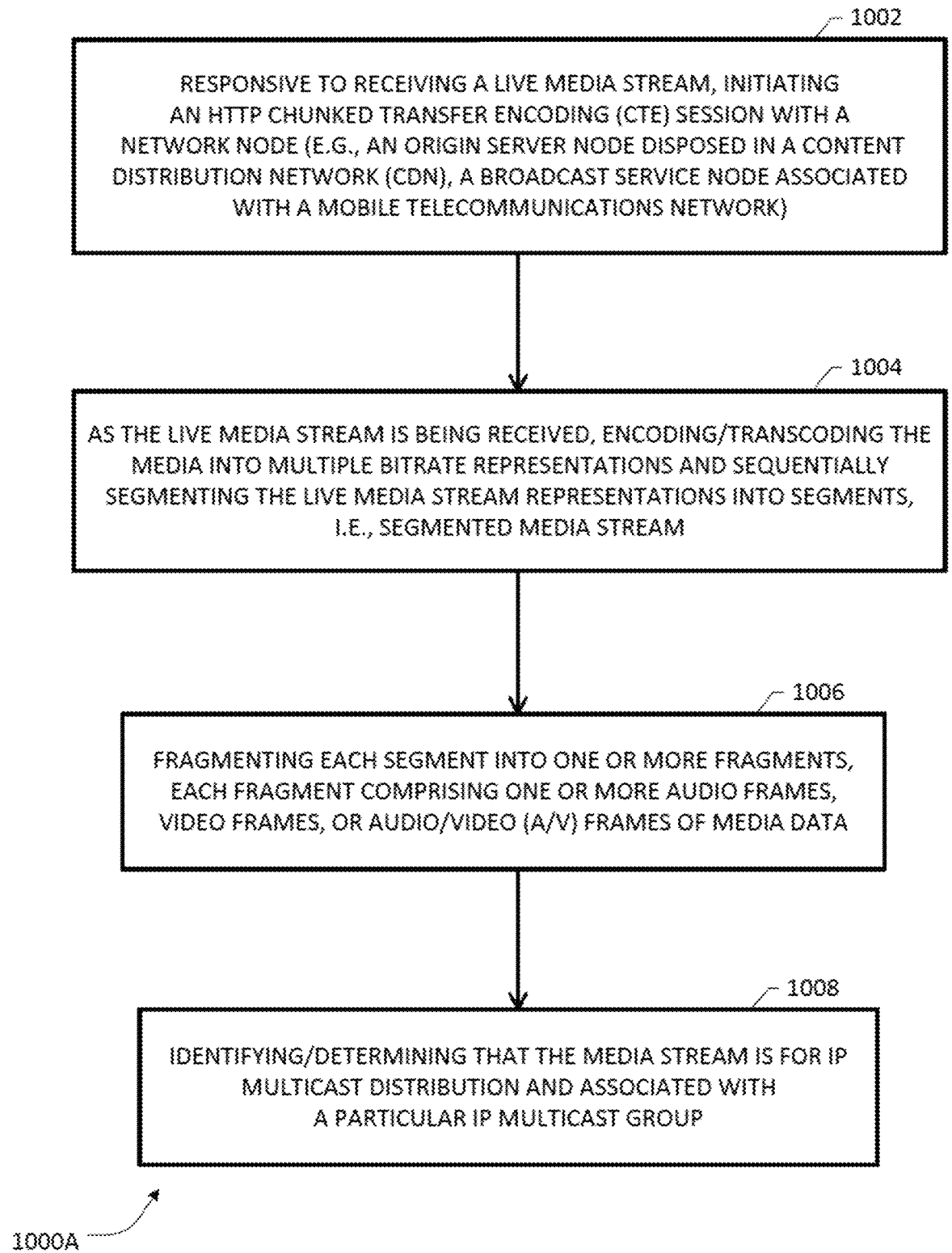
FIGS. 10A-10C are flowcharts of various steps, blocks or acts that may be combined or arranged into one or more embodiments for facilitating low latency media ingestion and distribution in an example streaming network according to the teachings of the present patent application.
Figure 10B:
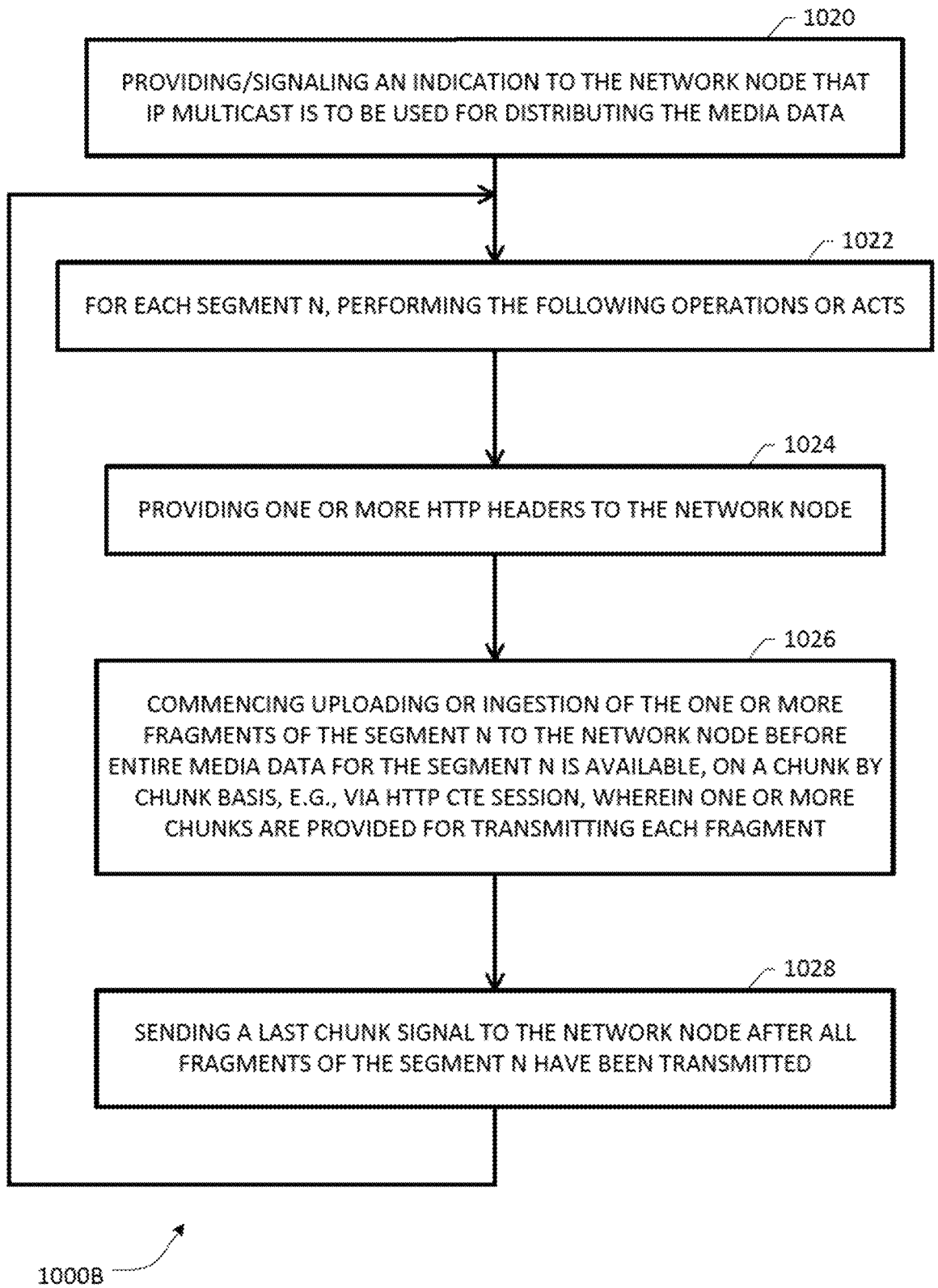
Figure 10C:
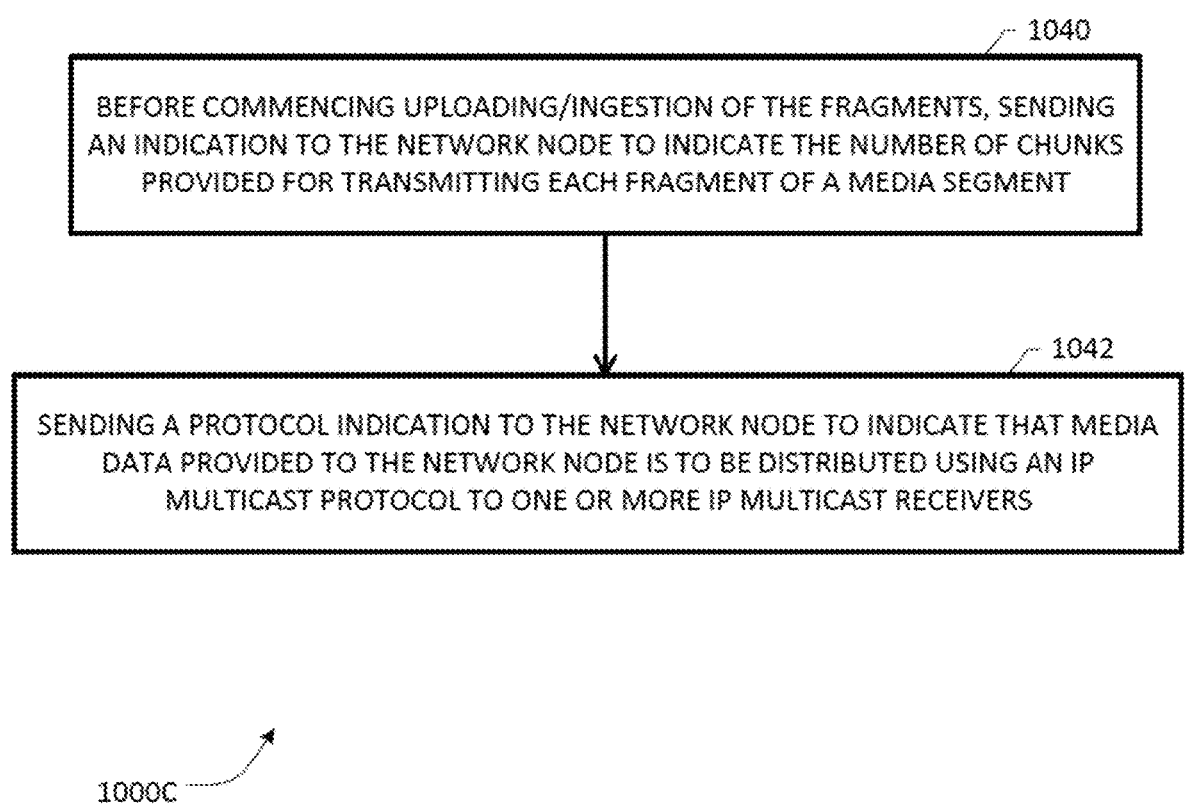

FIGS. 10A-10C are flowcharts of various steps, blocks or acts that may be combined or arranged into one or more embodiments for facilitating low latency media ingestion and distribution in an example IP multicast-based streaming network according to the teachings of the present patent application.

In particular, process 1000A shown in FIG. 10A is illustrative of various steps, blocks and/or acts that may be executed by a source network node, e.g., a media packager/segmenter, for facilitating low latency media ingestion of a live content source. At block 1002, an HTTP CTE session may be initiated between the source network node and an IP multicast ingress node (e.g., a CDN origin server node, a broadcast service node associated with a mobile telecommunications network, etc. configured to support a multicast distribution tree as noted above). In one embodiment, the live media stream is encoded, compressed, and/or transcoded, into a plurality of bitrate representations. As the live media stream is being received, each of the corresponding bitrate representations may be sequentially segmented into segments (block 1004). Each segment is fragmented into one or more fragments, wherein each fragment comprises one or more audio frames, video frames, or audio/video (A/V) frames of media data, or ISOBMFF frames (block 1006). At block 1008, the media stream is identified or otherwise determined for IP multicast distribution and may be associated with a particular IP multicast group.

Additional steps, blocks and/or acts that may be executed in association with a source network node are set forth as process 1000B of FIG. 10B. In one arrangement, an indication may be signaled to the network ingress node that IP multicast is to be used for distributing the media data, as set forth at block 1020. For each segment N, the following operations or acts may be performed by the source node in an iterative fashion as noted at block 1022 (e.g., as long as the live media stream is being received). One or more HTTP headers containing appropriate metadata information may be provided to the to the IP multicast ingress node, e.g., prior to or at the beginning of transmission of fragments of the segment (block 1024). Ingesting of the one or more fragments of the segment to the multicast network node is commenced before entire media data for the segment is available, on a chunk-by-chunk basis via the HTTP CTE session, wherein one or more chunks are provided for transmitting each fragment (block 1026). A last chunk signal may be provided to the IP multicast network node after all fragments of the segment have been transmitted (block 1028). As previously described, various explicit or inherent signaling mechanisms may be provided in an example implementation to indicate boundary termination/demarcation of a segment.

Still further additional steps, blocks and/or acts that may be executed in association with a source network node are set forth as process 1000C of FIG. 100. In one arrangement, before commencing uploading/ingestion of the fragments, an indication may be signaled to the IP multicast network node to indicate the number of chunks provided for transmitting each fragment of a media segment (block 1040). Additionally or alternatively, a protocol indication may also be signaled to the IP multicast network node to indicate that the uploaded/ingested media is to be distributed using a particular IP multicast protocol to one or more IP multicast receivers (block 1042). Such indication may be provided e.g. by a media packager node, like the headend segmenter/packager 202, the source segmenter/packager 302, or the source/segmenter 402/403 resp. 906/910, for example in a push operation. It may also be provided by a separate control node, e.g. in pull operation.

Figure 11A:
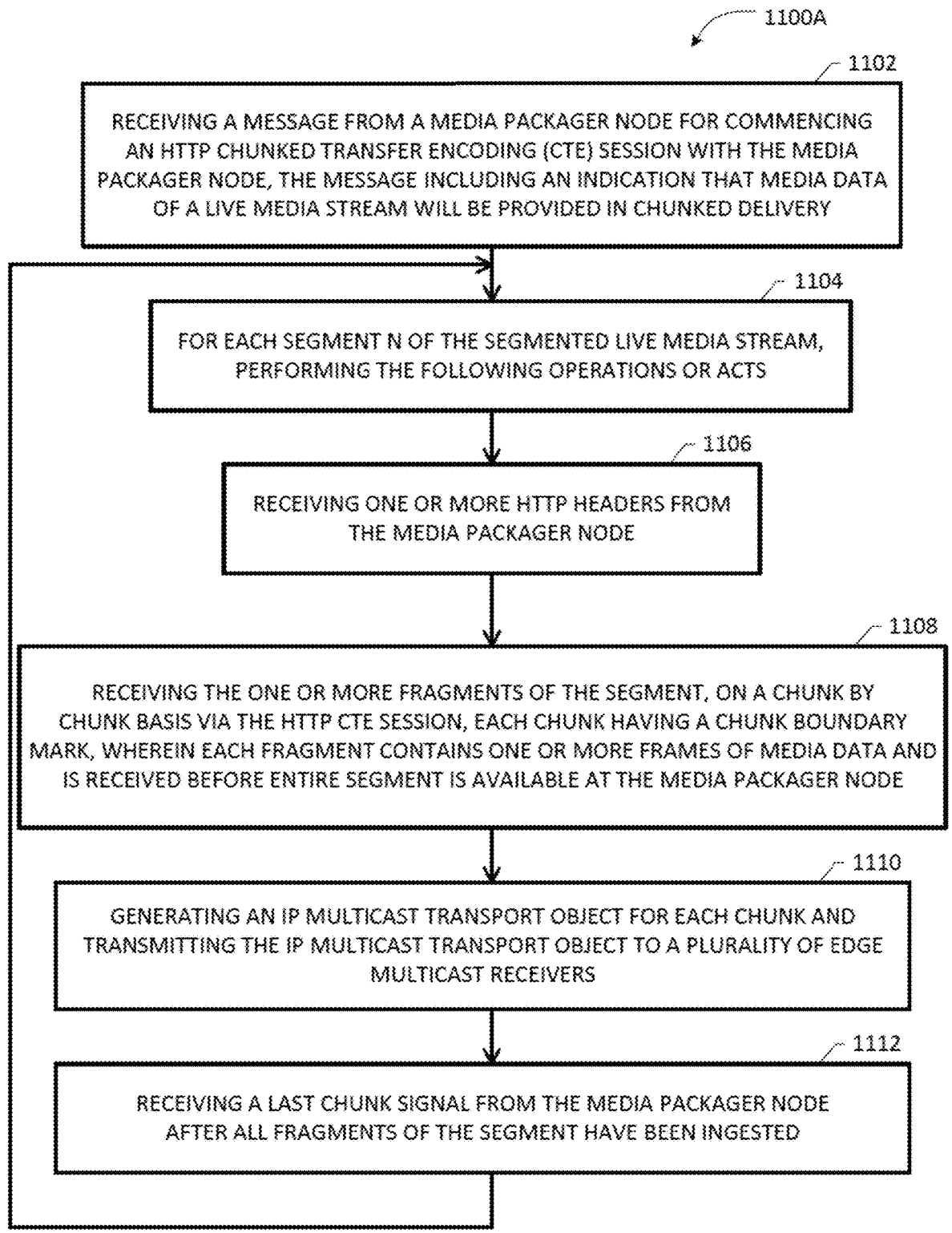
FIGS. 11A and 11B are flowcharts of various steps, blocks or acts that may be combined or arranged into one or more embodiments for facilitating further aspects of a low latency media ingestion and distribution system and method according to the teachings of the present patent application.
Figure 11B:
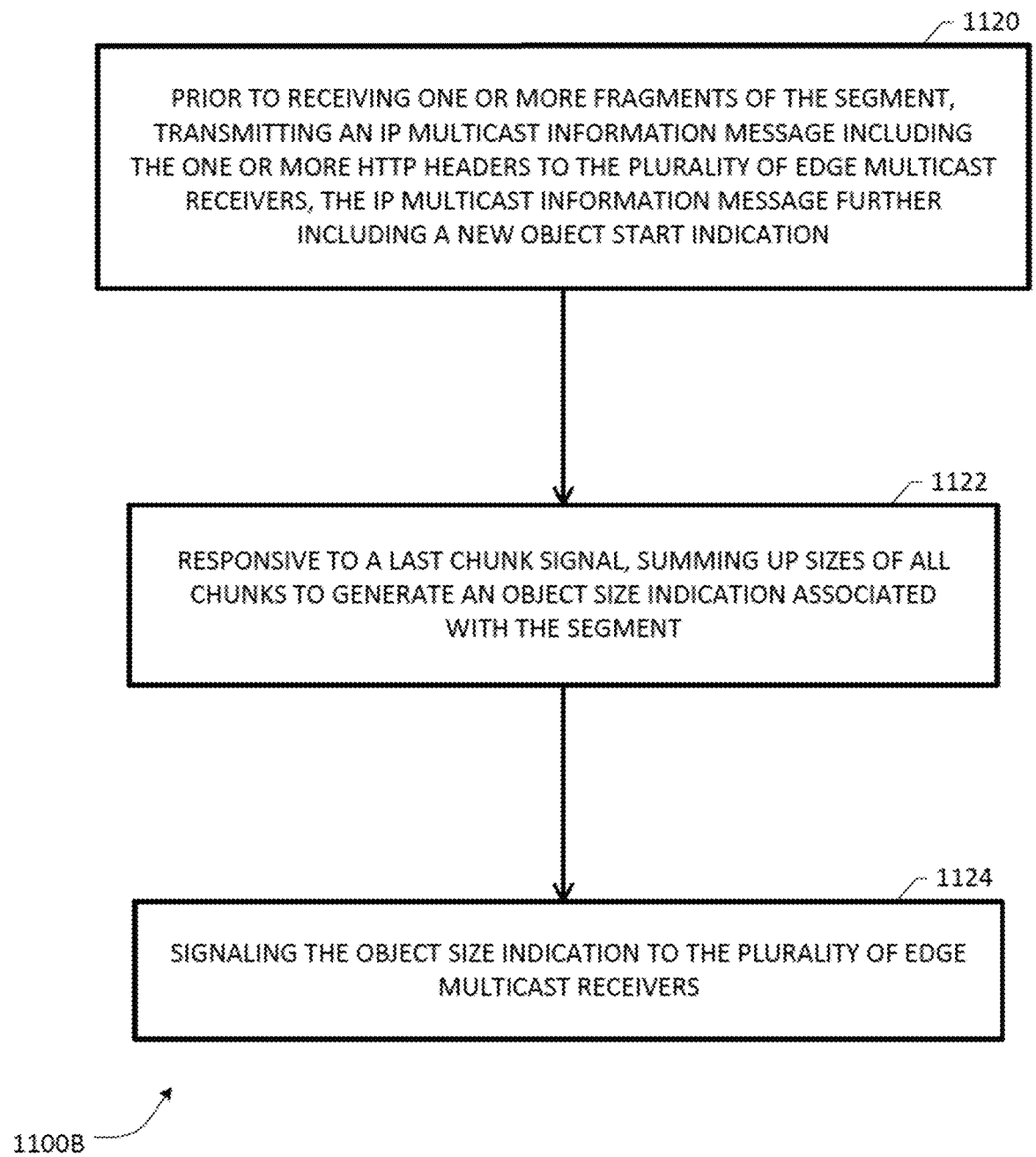

FIGS. 11A and 11B are flowcharts of various steps, blocks or acts that may be combined or arranged into one or more embodiments for facilitating further aspects of a low latency media ingestion and distribution system and method according to the teachings of the present patent application. In particular, process 1100A shown in FIG. 11A is illustrative of various steps, blocks and/or acts that may be executed by an IP multicast network node operating in association with a content source network node, e.g., a media packager/segmenter. At block 1102, a message may be received from the media packager/segmenter node for commencing an HTTP CTE session with the media packager node. In one embodiment, the message may include an explicit indication that media data of a live media stream will be uploaded or otherwise provided or ingested to the IP multicast network node across multiple bitrate representations using chunked delivery. For each segment N of the live media stream, the following operations or acts may be performed with respect to one or more the bitrate representations, in an iterative fashion as noted in block 1104 (e.g., as long as the chunked data transfer process continues for uploading media segments). At block 1106, one or more HTTP headers containing various pieces of metadata information are received from the media packager node. At block 1108, one or more fragments of the segment are received, on a chunk-by-chunk basis via the HTTP CTE session, each chunk having a chunk boundary mark, wherein each fragment contains one or more frames of media data and is received before entire segment is available at the media packager node. In one example embodiment, an IP multicast transport object may be generated for each chunk for transmission to a plurality of edge multicast receivers (block 1110). A last chunk signal may be received from the media packager node after all fragments of the segment have been uploaded or otherwise ingested (block 1112).

Additional steps, blocks and/or acts that may be executed in association with the IP multicast network node are set forth as process 1100B of FIG. 11B. In one arrangement, prior to receiving one or more fragments of the segment, an IP multicast information message may be transmitted, which includes the HTTP headers and other information, to the plurality of edge multicast receivers, the IP multicast information message further including a new object start indication (block 1120). Responsive to a last chunk signal, which may be explicitly or inherently signaled as noted previously, the sizes of all chunks may be added together to generate an object size indication associated with the segment (block 1122). In one example embodiment, the object size indication may be signaled to the plurality of edge multicast receivers to indicate segment boundary demarcation (block 1124).

Figure 12:
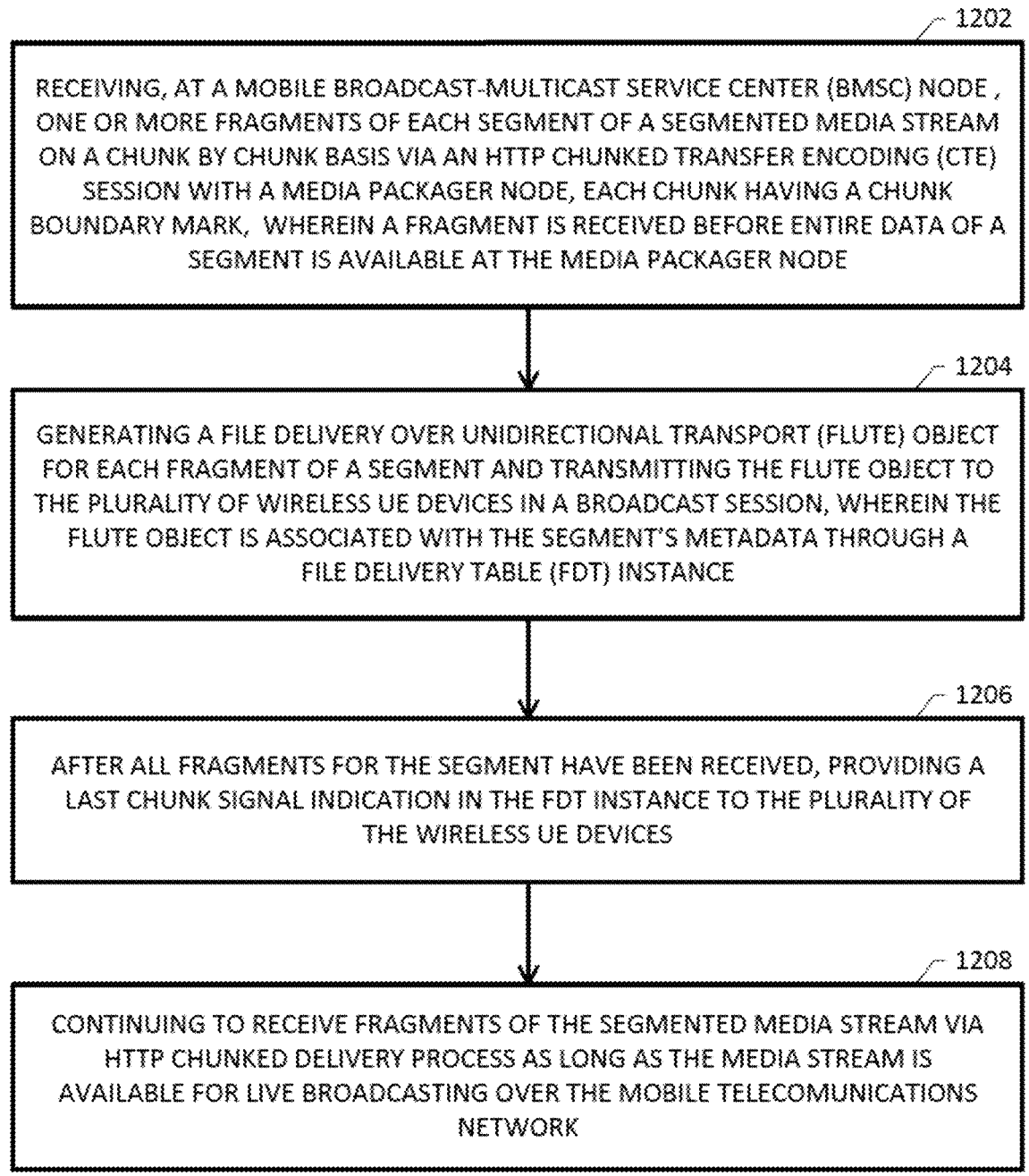
FIG. 12 is a flowchart of various steps, blocks or acts that may be combined or arranged into one or more embodiments for facilitating further aspects of a low latency media ingestion and distribution system and method according to the teachings of the present patent application.

FIG. 12 is a flowchart of various steps, blocks or acts that may be combined or arranged into one or more embodiments for facilitating further aspects of a low latency media ingestion and distribution system and method implemented in a mobile broadcast telecommunications network according to the teachings of the present patent application. Process 1200 shown in FIG. 12 is particularly illustrative of various steps, blocks and/or acts that may be executed by a BMSC node of an LTE mobile telecommunications network operating in association with a content source network (CSN) node, e.g., a media packager/segmenter. At block 1202, one or more fragments of each segment of a segmented media stream (e.g., in multiple bitrate representations) are received on a chunk-by-chunk basis via an HTTP CTE session with from the CSN node, each chunk having a chunk boundary mark, wherein a fragment is received before entire data of a segment is available at the CSN node. A FLUTE object is generated for each fragment of a segment for transmission to one or more wireless UE devices in a broadcast session, wherein the FLUTE object is associated with the segment's metadata through a File Delivery Table (FDT) instance (block 1204). After all fragments for the segment have been received, a last chunk signal indication may be provided in the FDT instance to the plurality of the wireless UE devices (block 1206). Fragments of the segmented media stream may continue to be received via HTTP chunked delivery process as long as the media stream is available for live broadcasting over the mobile telecommunications network, e.g., in a broadcast/multicast service over a broadcast area serving the subscribing wireless UE devices (block 1208).

Figure 13:
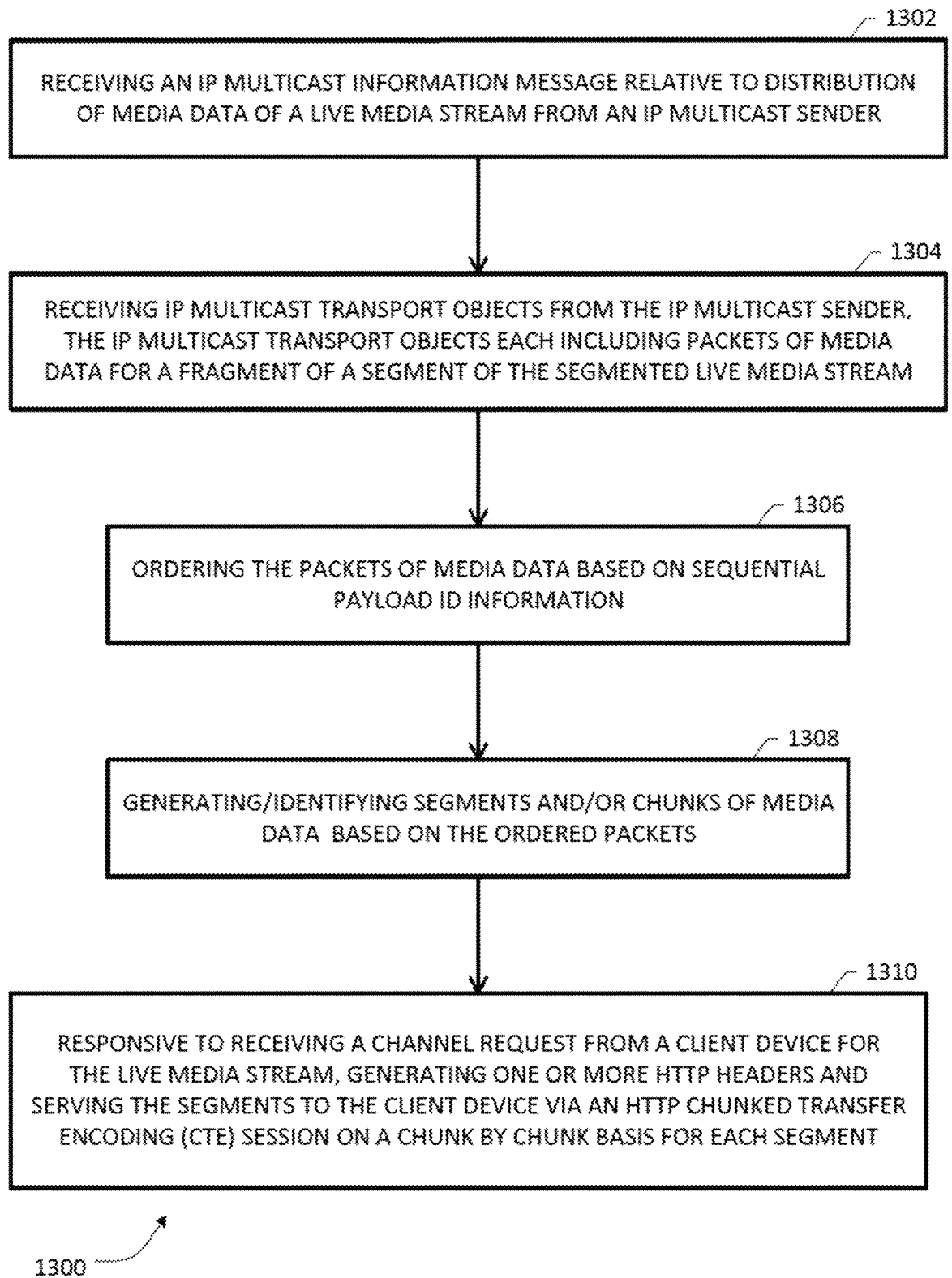
FIG. 13 is a flowchart of various steps, blocks or acts that may be combined or arranged into one or more embodiments for facilitating still further aspects of a low latency media ingestion and distribution system and method according to the teachings of the present patent application.

FIG. 13 is a flowchart of various steps, blocks or acts that may be combined or arranged into one or more embodiments for facilitating still further aspects of a low latency media ingestion and distribution system and method according to the teachings of the present patent application. Process 1300 shown in FIG. 13 is particularly illustrative of various steps, blocks and/or acts that may be executed at an IP multicast receiver, which may be co-located or otherwise integrated at different levels in an IP multicast distribution tree (e.g., at a CDN edge, a premises gateway node, an STB, a tethered or untethered UE device, etc.). In one embodiment, an IP multicast information message relative to distribution of media data of a live media stream may be received from an IP multicast sender (block 1302). One or more IP multicast transport objects may then be from the IP multicast sender, wherein the IP multicast transport objects each include packets of media data for a fragment of a segment of the segmented live media stream (block 1304). At block 1306, the packets of media data may be ordered based on sequential payload ID information (e.g., FEC ID). Based on the ordered packets, segments and/or chunks of the media data may be generated, stored, and/or identified (block 1308). Responsive to receiving a channel request from a client device for the live media stream, one or more HTTP headers may be generated having appropriate metadata. Further, the segments may be served to the client device via an HTTP CTE session on a chunk-by-chunk basis for each segment (block 1310). As noted previously, depending on client-side integration, an alternative or additional embodiment may involve direct file access API, which may be used instead of HTTP CTE download/delivery for purposes of the present invention.

Figure 14:
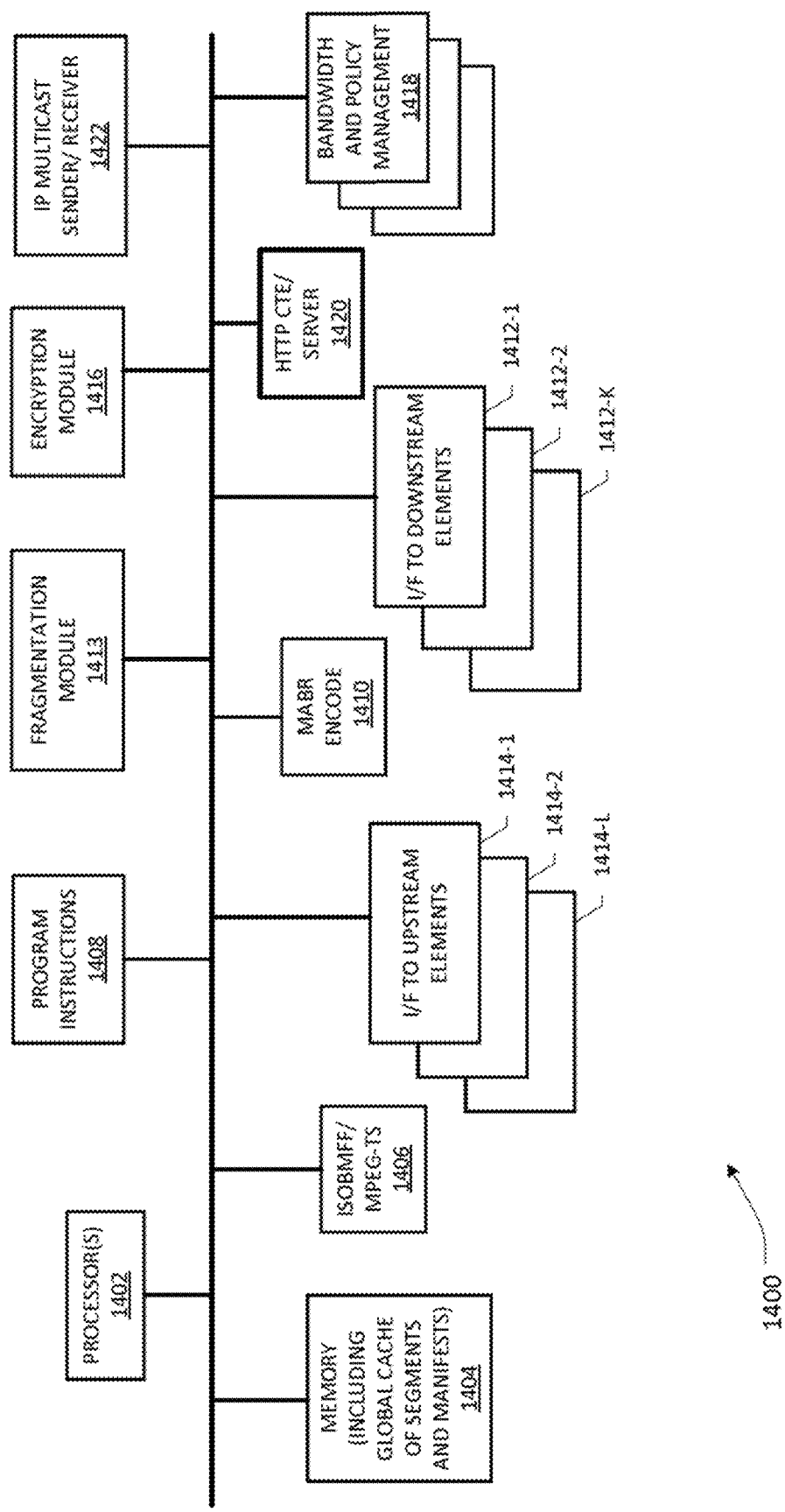
FIG. 14 depicts a block diagram of an apparatus that may be configured or arranged as different network elements or nodes operative to be deployed at one or more stages of a multicast streaming network for purposes of one or more embodiments of the present patent application.

FIG. 14 depicts a block diagram of an apparatus 1400 that may be configured or arranged as different network elements or nodes operative to be deployed at one or more stages of an IP multicast streaming network for purposes of one or more embodiments of the present patent application. For example, skilled artisans will recognize that apparatus 1400 may be configured or arranged as a network element or subsystem operative as a content source node, or an IP multicast sender node, or an IP multicast receiver node for facilitating low latency media ingestion and distribution in one or more network environments according to an embodiment of the present patent disclosure. Accordingly, depending on implementation and/or network architecture of a media communications network, apparatus 1400 may be configured in different ways suitable for operation at multiple hierarchical levels of a CDN/CSN and/or mobile broadcast network, e.g., at a super headend node, regional headend node, video hub office node, ABR origin server node, central or regional or edge distribution node in a CDN, BMSC node of an EPC network, etc., on the basis of where source media feeds or other content sources are injected into an example deployment. Suitable network interfaces, e.g., I/F 1414-1 to 1414-L, may therefore be provided for effectuating communications with other network infrastructure elements and databases (e.g., source feeds, global databases for storing encoded media fragments, metadata/manifest files, DRM entities, etc.). Likewise, interfaces 1412-1 to 1412-K for effectuating communications sessions with one or more downstream nodes, e.g., IP multicast senders/receivers, origin servers, regional distribution centers, other intermediary network elements, etc., may be provided as part of the apparatus 1400. One or more processors 1402 may be provided as part of a suitable computer architecture for providing overcall control of the apparatus 1400, which processor(s) 1402 may be configured to execute various program instructions stored in appropriate memory modules or blocks, e.g., persistent memory 1404 as well as specific program instructions 1408, including additional modules or blocks specific to encoding/transcoding, media segmentation, fragment generation and/or containerization, HTTP chunked delivery, etc. By way of illustration, an ABR encode/transcode block 1410 is operative for generating segments of multi-bitrate representations of various source media, for which suitable metadata files may be generated by a manifest generator (not specifically shown). A multi-encryption block 1416 is operative for encrypting the content in a plurality of DRM/encryption schemes depending on implementation. A media packaging block 1406 for packaging the media in DASH/ISOBMFF/CMAF and/or MPEG-TS formats may be provided for operation in conjunction with a media fragmenter 1413 for effectuating segment fragmentation at various levels granularity (e.g., building on frame-by-frame basis) for purposes of one or more embodiments of the present invention. In additional or alternative arrangements, a content push policy management module, a bandwidth and content policy management module, program entitlements, etc., collectively shown as modules or blocks 1418, may also be provided as part of a backend IP multicast ABR management node in an example network architecture. An HTTP CTE module 1420 is operative to provide HTTP chunked data transmission/reception functionalities (depending on which HTTP CTE endpoint the apparatus 1400 is configured as). In similar fashion, an IP multicast server/receiver 1422 may be included in an arrangement or rearrangement of apparatus 1400 to facilitate IP multicast operations adapted to distribution of low latency fragments in accordance with various IP multicast protocols, e.g., NORM, FCAST, FLUTE, etc. as described hereinabove in detail. As previously noted, IP receiver functionality may be integrated at a gateway level or even as a UE device depending on where the IP multicast endpoint is disposed. Skilled artisans will further recognize that in a mobile broadcast environment, apparatus 1400 may be deployed as a BMSC node, with suitable interfaces 1414-1 to 1414-L (e.g., to other EPS/EPC infrastructure nodes, CSN nodes, etc.) as well as suitable interfaces 1412-1 to 1412-K to MBMS gateways, etc.

Figure 15:
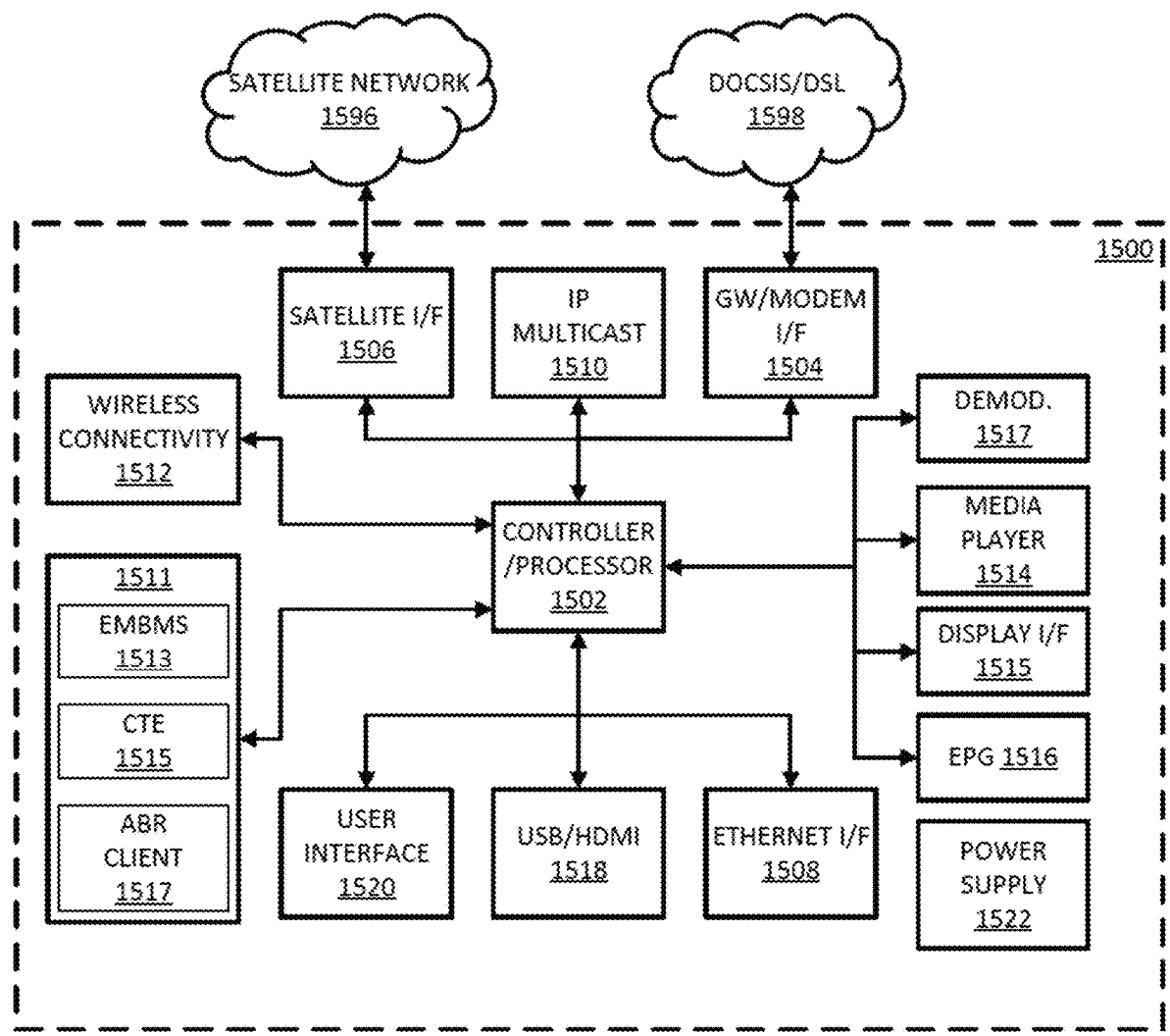
FIG. 15 depicts a block diagram of an apparatus that may be configured or arranged as a premises equipment device or user equipment (UE) device for purposes of one or more embodiments of the present patent application.

FIG. 15 is a block diagram of an example customer premises equipment (CPE) 1500 configured for performing various client-side processes according to one or more embodiments of the present patent disclosure. CPE device 1500 is generally representative of a plurality of UE devices, e.g., NXG STBs, legacy STBs, reach devices, etc., shown in one or more Figures described above, and may include appropriate hardware/software components and subsystems configured for performing any of the device-side processes (either individually or in any combination thereof) with respect to local cache access, content request generation, metadata parsing, HTTP CTE request/response processing or API processing for direct consumption of IP multicast objects, etc., in conjunction with media segment/stream retrieval and rendering, for purposes of the present patent application depending on implementation. One or more microcontrollers/processors 1502 are provided for the overall control of the client device 1500 and for the execution of various stored program instructions embodied in a persistent memory e.g., as an eMBMS client 1513, a CTE receiver 1515, and/or an ABR streaming client application 1517, etc., that may be part of a memory subsystem 1511 operative with an IP multicast receiver 1510 of the subscriber station 1500. Controller/processor complex referred to by reference numeral 1502 may also be representative of other specialty processing modules such as graphic processors, video processors, digital signal processors (DSPs), and the like, operating in association with suitable video and audio interfaces (not specifically shown). Appropriate interfaces such as network I/F modules 1504 and 1506 involving or operating with tuners, demodulators, descramblers, MPEG/H.264/H.265 decoders/demuxes may be included for processing and interfacing with IP multicast and other content signals received via a DSL/CMTS network 1598 or a satellite network 1596. Where an STB is configured as an example endpoint device, suitable demodulators 1517 (e.g., may include NTSC demodulator and/or ATSC/PAL demodulator, and the like) may also be included. One or more media players 1514 may be provided for operating in conjunction with the other subsystems of the client device 1500 for facilitating user control over media playback, including channel change requests. Example media players may be configured to operate with one or more A/V coder/decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like.

Other I/O or interfaces such as a display interface 1515, Electronic Program Guide (EPG) 1516 for identifying media service channels (e.g., in an STB implementation), touch screen or keypad interface 1520, USB/HDMI ports 1518, Ethernet I/F 1508, and short-range and wide area wireless connectivity interfaces 1512 may also be provided depending on device configuration. A hard disk drive (HDD) or DVR system (not specifically shown) may be included in an STB implementation for local storage of various program assets. A suitable power supply block 1522 may include AC/DC power conversion to provide power for the device 1500. It should be appreciated that the actual power architecture for the subscriber device 1500 may vary by the hardware platform used, e.g., depending upon the core SoC (System-on-Chip), memory, analog front-end, analog signal chain components and interfaces used in the specific platform, and the like.

Based on the foregoing, skilled artisans will recognize that embodiments of the present invention can significantly reduce transmission delay inside a CDN or a mobile broadcast network although a reliable IP multicast protocol is used for media distribution. With respect to mobile media delivery, it should be appreciated that a particular embodiment set forth herein advantageously provides a solution for introducing DASH/ISOBMFF carriage in an LTE broadcast deployment with low latency. Further benefits of the present invention in this context may be realized in view of the fact that there is a strong need in both the media and industry as well as from the public safety perspective. In the media area, increasing use case scenarios can be seen where an end user has a temporal or visual reference point—meaning that an end user perceives latency as an important attribute, especially, in live media consumption. Example use cases are found within "in-stadium", user self-generated live content and potential virtual/augmented reality (VR/AR) use cases, wherein an embodiment of chunked FLUTE delivery in an LTE broadcast network may be advantageously deployed. In the public safety arena, similar low latency requirements are also being expected in mission-critical use of LTE broadcast as part of TETRA narrow-band replacement where near real-time situational video use cases are essential.

One skilled in the art will recognize that various apparatuses, subsystems, functionalities/applications and/or one or more network elements, and/or endpoint nodes as well as the underlying network infrastructures set forth above may be architected in a virtualized environment according to a network function virtualization (NFV) architecture in additional or alternative embodiments of the present patent disclosure. For instance, various physical resources, databases, services, applications and functions executing within an example network of the present application, including certain GW/UE/CPE functionalities, may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of hardware/software, e.g., ABR encoders, encryption systems and schemes, segmentation and/or fragmentation mechanisms, media asset packaging/containerization, segment/manifest databases, IP multicast functionality, etc., as well as platforms and infrastructure of NDCs, RDCs, origin servers, MABR network elements may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An origin server, comprising:
   at least one of an HTTP chunked transfer encoding, CTE, server and client; and
   an IP multicast sender;
   the origin server comprising a processor and a memory in communication with the processor, the processor being configured to:
      receive a message from a media packager node for commencing an HTTP CTE session with the media packager node, the message including an indication that media data of a segmented live media stream is provided in a chunked delivery, the segmented live media stream including a plurality of segments;
      for each segment N of the plurality of segments of the segmented live media stream, receive one or more HTTP headers from the media packager node;
      receive one or more fragments for each segment N, on a chunk-by-chunk basis via the HTTP CTE session, each chunk having a chunk boundary mark, each fragment containing one or more frames of media data and being received before entire media data for the segment is available at the media packager node;
      generate transport objects, including IP multicast transport objects, for the received chunks and transmitting the transport objects to a plurality of receivers; and
      receive a last chunk signal from the media packager node after all fragments of the segment have been ingested.

2. The origin server of claim 1, being one of an origin server associated with a content distribution network, CDN, and a broadcast-multicast service center, BMSC, node of a mobile telecommunications network.

3. The origin server of claim 1, where in the processor is further configured to cause transmission, prior to receiving one or more fragments, of an IP multicast information message including the one or more HTTP headers to the plurality of receivers, the IP multicast information message further including a new transport object start indication.

4. The origin server of claim 1, where in the processor is further configured to add up sizes of all chunks, responsive to the last chunk signal, to generate an object size indication associated with the segment and signal the object size indication to the plurality of edge multicast receivers.

5. An endpoint node associated with an IP multicast distribution network, the endpoint node comprising:
an IP multicast receiver
integrated with a wireless user equipment, UE, the wireless UE comprising:
one of an HTTP chunked transfer encoding, CTE, server and proxy;
an evolved multimedia broadcast/multicast service, eMMS, client including the IP multicast receiver and an HTTP CTE receiver;
a processor and a memory in communication with the processor, the processor being configured to:
receive an IP multicast information message relative to distribution of media data of a live media stream from an IP multicast sender;
receive IP multicast transport objects from the IP multicast sender, the IP multicast transmission objects including packets of media data;
order the packets of media data based on sequential payload ID information;
generate chunks of media data based on the ordered packets; and
responsive to receiving a channel request from a client device for the live media stream, serve the chunks to the client device; and
responsive to receiving a request from the HTTP CTE receiver, generate one or more HTTP headers and serving fragments by the HTTP CTE server via an HTTP CTE session on a chunk-by-chunk basis, the chunks being provided to a media player buffer for rendering at a display of the wireless UE device.

6. The endpoint node of claim 5, wherein the IP multicast transport objects are received according to a reliable IP multicast protocol comprising at least one of File Delivery over Unidirectional Transport, FLUTE, protocol, NACK-Oriented Multicast, NORM, protocol, and FCAST protocol.

7. The endpoint node of claim 5, wherein the IP multicast receiver is integrated with at least one of a customer premises gateway, a set-top box, STB, and a user equipment, UE, device, configured to operate as the endpoint node.

8. The endpoint node of claim 5, comprising:
one of an HTTP chunked transfer encoding, CTE, server and proxy;
an evolved multimedia broadcast/multicast service, eMMS, client including the IP multicast receiver and an HTTP CTE receiver; and
the processor being configured for:
receiving, at the IP multicast receiver, the IP multicast information message from an IP multicast sender associated with a broadcast-multicast service center, BMSC, node of a mobile telecommunications network;
receiving, at the IP multicast receiver, the IP multicast transport objects as a plurality of File Delivery over Unidirectional Transport, FLUTE, objects, each containing packets of media data for a fragment of a segment in the segmented media stream; and
creating chunks of media data based on the ordered packets.

9. The endpoint node of claim 8, wherein the one or more HTTP headers are sent together with content location information and the one or more HTTP headers are provided to the eMBMS client before entire media data for a segment is available.

10. The endpoint node of claim 8, wherein the segmented media stream comprises a Dynamic Adaptive Streaming over HTTP, DASH, stream and the program instructions further comprise instructions for providing Availability Time Offset, ATO, information to the HTTP CTE receiver via a media presentation description, MPD, file.

11. The endpoint node of claim 8, wherein the IP multicast receiver is configured to receive a last chunk indication signal in a File Delivery Table, FDT, instance from the BMSC node at the end of transmission of all fragments for a segment and the program instructions further comprise instructions for identifying segment boundary information based on the last chunk indication signal.

12. The endpoint node of claim 8, further comprising a radio interface configured to operate with a Long Term Evolution, LTE, network and wherein the FLUTE objects are received in a broadcast session effectuated in at least one of a synchronized single-frequency network, SFN, over a plurality of eNB cells of the LTE network and a single-cell Point-to-Multipoint, PTM, transmission in the LTE network.

13. A media streaming network, comprising:
a media ingest network portion comprising a first processor and a first memory in communication with the first processor, the first processor being configured to provide low latency uploading of media fragments of a segmented live media stream using HTTP chunked transfer encoding, CTE, wherein one or more fragments of a segment are ingested on a chunk-by-chunk basis before entire media data of the segment becomes available;
an Internet Protocol, IP, multicast distribution network portion coupled to the media ingest network portion, the IP multicast distribution network portion comprising a second processor and a second memory in communication with the second processor, the second processor being configured to distribute chunked media data to one or more IP multicast recipients using an IP multicast protocol; and
a delivery network portion comprising a third processor and a third memory in communication with the third processor, the first processor being configured to deliver the media data to a client in an HTTP CTE download session with a serving IP multicast recipient; and
an endpoint node associated with an IP multicast distribution network, the endpoint node comprising an IP multicast receiver integrated with a wireless user equipment, UE, the wireless UE comprising:
one of an HTTP chunked transfer encoding, CTE, server and proxy;
an evolved multimedia broadcast/multicast service, eMMS, client including the IP multicast receiver and an HTTP CTE receiver;
a fourth processor and a fourth memory in communication with the processor, the fourth processor being configured to:
responsive to receiving a request from the HTTP CTE receiver, generate one or more HTTP headers and serving fragments by the HTTP CTE server via an HTTP CTE session on a chunk-by-chunk basis, the chunks being provided to a media player buffer for rendering at a display of the wireless UE device.

14. The media streaming network of claim 13, further comprising at least one of:
a media packager, the media packager comprising:
at least one network interface configured to receive live media streams from one or more content sources;

the media packager being configured to:
  segment a received live media stream into a plurality of segments, wherein each segment comprises a plurality of fragments, each fragment comprising one or more frames of media data;
  identify that the segmented live media stream is to be distributed using IP multicast and associate the segmented live media stream with a particular IP multicast group;
  initiate the HTTP chunked transfer encoding, CTE, session with an origin server;
  for each segment N, commence ingesting fragments of a segment N to the origin server via the CTE session before entire media data for the segment N is available, one or more chunks being provided for transmitting each fragment; and
  send a last chunk signal to the origin server node after all fragments of the segment N have been transmitted;

the origin server comprising:
  at least one of an HTTP chunked transfer encoding, CTE, server and client; and
  an IP multicast sender;
  the origin server being configured to
    receive a message from a media packager node for commencing the HTTP CTE session with the media packager node, the message including an indication that media data of the segmented live media stream is provided in a chunked delivery;
    for each segment N of the live media stream, receive one or more HTTP headers from the media packager node;
    receive one or more fragments of the segment, on a chunk-by-chunk basis via the HTTP CTE session, each chunk having a chunk boundary mark, each fragment containing one or more frames of media data and is received before entire media data for the segment is available at the media packager node;
    generate transport objects, particularly IP multicast transport objects, for the received chunks and transmitting the transport objects to a plurality of receivers; and
    receive the last chunk signal from the media packager node after all fragments of the segment have been ingested; and an endpoint node associated with an IP multicast distribution network, the endpoint node comprising:
  an IP multicast receiver; and
  the endpoint node being configured to:
    receive an IP multicast information message relative to distribution of media data of a live media stream from an IP multicast sender;
    receive IP multicast transport objects from the IP multicast sender, the IP multicast transmission objects including packets of media data;
    order the packets of media data based on sequential payload ID information;
    generate chunks of media data based on the ordered packets; and
    responsive to receiving a channel request from a client device for the live media stream, serve the chunks to the client device.

\* \* \* \* \*